United States Patent
McMaster et al.

(10) Patent No.: US 11,846,643 B2
(45) Date of Patent: Dec. 19, 2023

(54) TEST SAMPLE HANDLING SYSTEM WITH ROTARY CAROUSEL

(71) Applicant: ALPHA TECHNOLOGIES SERVICES LLC, Akron, OH (US)

(72) Inventors: Matthew Scot McMaster, Wadsworth, OH (US); Keith Wayne Buzek, Akron, OH (US)

(73) Assignee: Alpha Technologies Services LLC, Akron, OH (US)

(*) Notice: Subject to any disclaimer, the term of this patent is extended or adjusted under 35 U.S.C. 154(b) by 308 days.

(21) Appl. No.: 17/211,214

(22) Filed: Mar. 24, 2021

(65) Prior Publication Data

US 2021/0302455 A1 Sep. 30, 2021

Related U.S. Application Data

(60) Provisional application No. 63/000,575, filed on Mar. 27, 2020.

(51) Int. Cl.
*G01N 35/02* (2006.01)
*G01N 35/00* (2006.01)

(52) U.S. Cl.
CPC ..... *G01N 35/025* (2013.01); *G01N 35/00029* (2013.01); *G01N 2035/00049* (2013.01)

(58) Field of Classification Search
CPC ......... G01N 2035/00138; G01N 1/312; G01N 2035/0413; G01N 2035/0405; G01N 2035/0427; G01N 2001/315; G01N 2035/00752; G01N 2035/0401; G01N 35/025; G01N 35/00029; G01N 2035/00049; G01N 35/00; G01N 35/02; G01N 35/0098; G01N 35/0099; B01L 2300/021; B01L 2200/16; B01L 9/52; B01L 2200/04; B01L 2200/18; B01L 2300/0822

See application file for complete search history.

(56) References Cited

U.S. PATENT DOCUMENTS

| | | | |
|---|---|---|---|
| 4,649,737 | A | 3/1987 | Jones |
| 4,900,513 | A | 2/1990 | Barker et al. |
| 5,439,645 | A | 8/1995 | Saralegui et al. |
| 6,536,289 | B2 | 3/2003 | Borowczak et al. |

(Continued)

*Primary Examiner* — Matthew D Krcha
*Assistant Examiner* — Tingchen Shi
(74) *Attorney, Agent, or Firm* — Snyder, Clark, Lesch & Chung, LLP

(57) ABSTRACT

A test sample handling system for transporting test samples to a testing mechanism comprises a rotary sample holder including a carrier cylinder configured to rotate about a central rotational axis thereof and a carrier arm adjustable between a retracted position and an extended position. A carrier is configured to support one of the test samples and is removably coupled to the carrier cylinder. A lifter mechanism is adjustable between a lowered position and a raised position with the adjustment of the carrier arm from the retracted position to the extended position including a decoupling of the carrier from the carrier cylinder and a transporting of the carrier and the corresponding one of the samples to a position above the lifter mechanism. An adjustment of the lifter mechanism from the lowered position to the raised position includes a removal of the one of the samples from being supported by the carrier.

20 Claims, 9 Drawing Sheets

(56) References Cited

U.S. PATENT DOCUMENTS

| | | | |
|---|---|---|---|
| 7,628,954 B2 | 12/2009 | Gomm et al. | |
| 2007/0151672 A1* | 7/2007 | Takahashi | G01N 1/312 |
| | | | 156/522 |
| 2009/0129979 A1* | 5/2009 | Kegelman | G01N 35/109 |
| | | | 422/63 |
| 2013/0052331 A1* | 2/2013 | Kram | G01N 1/2813 |
| | | | 118/100 |
| 2018/0059395 A1* | 3/2018 | Gholap | G02B 21/34 |

* cited by examiner

TEST SAMPLE HANDLING SYSTEM WITH ROTARY CAROUSEL

CROSS-REFERENCE TO RELATED PATENT APPLICATION

The patent application claims priority to U.S. Provisional Patent Application Ser. No. 63/000,575, filed on Mar. 27, 2020, the entire disclosure of which is hereby incorporated herein by reference.

TECHNICAL FIELD

The present disclosure relates generally to a handling system for use with test samples, and more particular to a handling system having a rotary sample holder and a lifter mechanism for transferring elastomeric test samples to a testing area of the handling system.

BACKGROUND

It is desirable to periodically test elastomeric materials to determine if the elastomeric materials have the desired characteristics for a given application. For example, such materials may be tested for durability by subjecting the materials to certain stresses and strains via compression, stretching, bending, or the like. Such tests may be performed on a plurality of test samples formed from the elastomeric material via use of a suitable sample handling system. The two existing types of sample handling systems generally include queueing systems and fully automated systems.

The queueing systems of the prior art generally include a lower roll of film on which the test samples are hand placed by an operator of the queueing system. The lower film may extend over a staging platform forming a support surface for supporting the test samples when placed by the operator. The staging platform may include markings or the like spaced apart in a direction of motion of the lower film, wherein each of the markings indicates available positions for each of the test samples to be placed in order to be queued for the testing process. The spacing between each of the adjacent test samples corresponds to a distance of travel of the lower film following the testing of each of the test samples. An upper roll of film is also disposed above the staging platform to cause each of the queued test samples to be disposed between a length of the lower film and a length of the upper film. The lower film and the upper film are each configured to be selectively grasped and pulled linearly by a haul-off mechanism following the completion of each test performed regarding one of the test samples.

The testing of the each of the test samples occurs in a testing region of the system, wherein the test sample is sandwiched between the upper film and the lower film. The upper film, the lower film, and the recently tested sample are then grasped by the haul-off mechanism to pull each of the rolls of film the distance corresponding to the distance between adjacent ones of the test samples waiting in the queue, thereby positioning the next of the test samples in the queue at the desired position within the testing region.

The queueing systems of the prior art are limited in several respects. First, such queueing systems typically include only a limited number of queueing positions such as five or ten spaced apart positions for the test samples to be hand placed by the operator. The limited number of queueing positions leads to the need for increased interaction with the queueing system by the operator to maintain continuous testing of the samples, as additional test samples must be constantly placed on the staging platform as the haul-off mechanism continuously pulls the upper and lower films following each testing process. Second, the hand placement of the test samples by the operator may lead to misalignment of the test samples when transported into the testing region. The misalignment can compromise the results of the sample testing process. Third, such queueing systems require the removal of each of the previous hand placed test samples if a need arises for the interruption of the testing process. For example, under some circumstances it may be desirable for the operator to test a sample out of order when time restrictions are applicable such as when the testing of the sample affects the production schedule of a component produced using the elastomeric material being tested. The removal and replacement of the samples may lead to the incorrect ordering and subsequent misidentification of the samples following the testing process. Fourth, it is common for operators of such queueing systems to intentionally skip positions on the staging platform when attempting to distinguish between different groups of samples such as when different batches of the elastomeric material being tested are to be distinguished from each other. The skipping of one of the positions results in a length of each of the upper film and the lower film being fed through the testing region without the carrying out of the testing process. This leads to the wasting of the film, which can be cost prohibitive.

The fully automated systems seek to correct the deficiencies of the above described queueing systems. Such fully automated systems utilize a haul-off mechanism, testing region, upper roll of film, and lower roll of film in similar fashion to the described queueing systems. The automated systems differ in that a greater quantity of the test samples are preloaded in a suitable holding device while an automated pick-up mechanism individually picks the test samples from the holding device before placing each of the test samples at a desired position on the lower roll of the film in similar fashion to that described with reference to the aforementioned queueing systems. The holding device may include a tray or similar structure having a plurality of pockets or similar locating features with each of the locating features configured to position one of the test samples therein or thereon. The pick-up mechanism is transported to the position of one of the locating features of the holding device where the pick-up mechanism grasps and then transports the corresponding one of the test samples to the desired position on the lower film for initiating the testing process.

Although the fully automated systems provide advantages over the previously described queueing systems, the fully automated systems can still be improved to be more efficient and consistent. For example, one problem inherent to the use of a pick-up mechanism relates to the manner in which the elastomeric material forming each of the test samples is relatively tacky. The tackiness can cause the test samples to stick to either of the holding device when the samples are initially picked-up or the pick-up mechanism itself when the test samples are being released from the grip of the pick-up mechanism. Such problems can lead to misalignment of the test samples when placed in the associated test region, thereby frustrating the accuracy of the testing process.

The fully automated systems also suffer from some of the same problems as described above with reference to the fully automated systems. The use of a holding device with individual pockets or slots for locating the test samples prior to being picked-up can lead to the test samples being misaligned within the individual pockets or slots, thereby leading to the eventual misalignment of the test sample when grasped by the pick-up mechanism. The use of the holding device also frustrates the ability of the operator to replace the test samples or to alter the order of the test samples once the automated testing process has been initiated. The operator must shut down the automated process, remove or manipulate the corresponding holding device, manually insert or replace the associated test samples, reinstall or otherwise manipulate the holding device back to the operational position, run the testing on the newly inserted or replaced test samples, and then reinitiate the automated testing process with respect to the remaining test samples. This process can be time consuming and prone to operator error, such as misidentifying the source of one or more of the test samples or reordering the test samples in the incorrect order.

It would accordingly be desirable to produce an improved test sample handling system addressing the shortcomings of the existing queueing systems and fully automated systems as described hereinabove.

SUMMARY OF THE INVENTION

Consonant with the present disclosure, an improved test sample handling system addressing the shortcomings of the prior art has surprisingly been discovered.

According to one embodiment of the present invention, a test sample handling system for transporting test samples to a testing mechanism comprises a rotary sample holder including a carrier cylinder configured to rotate about a central rotational axis thereof and a carrier configured to support one of the test samples with the carrier removably coupled to the carrier cylinder.

According to another embodiment of the invention, a test sample handling system for transporting test samples to a testing mechanism comprises a rotary sample holder including a carrier cylinder configured to rotate about a central rotational axis thereof and a carrier arm adjustable between a retracted position and an extended position. A carrier is configured to support one of the test samples and is removably coupled to the carrier cylinder. A lifter mechanism is adjustable between a lowered position and a raised position with the adjustment of the carrier arm from the retracted position to the extended position including a decoupling of the carrier from the carrier cylinder and a transporting of the carrier and the corresponding one of the samples to a position above the lifter mechanism. An adjustment of the lifter mechanism from the lowered position to the raised position includes a removal of the one of the samples from being supported by the carrier.

DESCRIPTION OF THE DRAWINGS

Further details, features and advantages of the invention will emerge from the following specification of sample embodiments making reference to the accompanying drawings.

DETAILED DESCRIPTION

Figure 1:
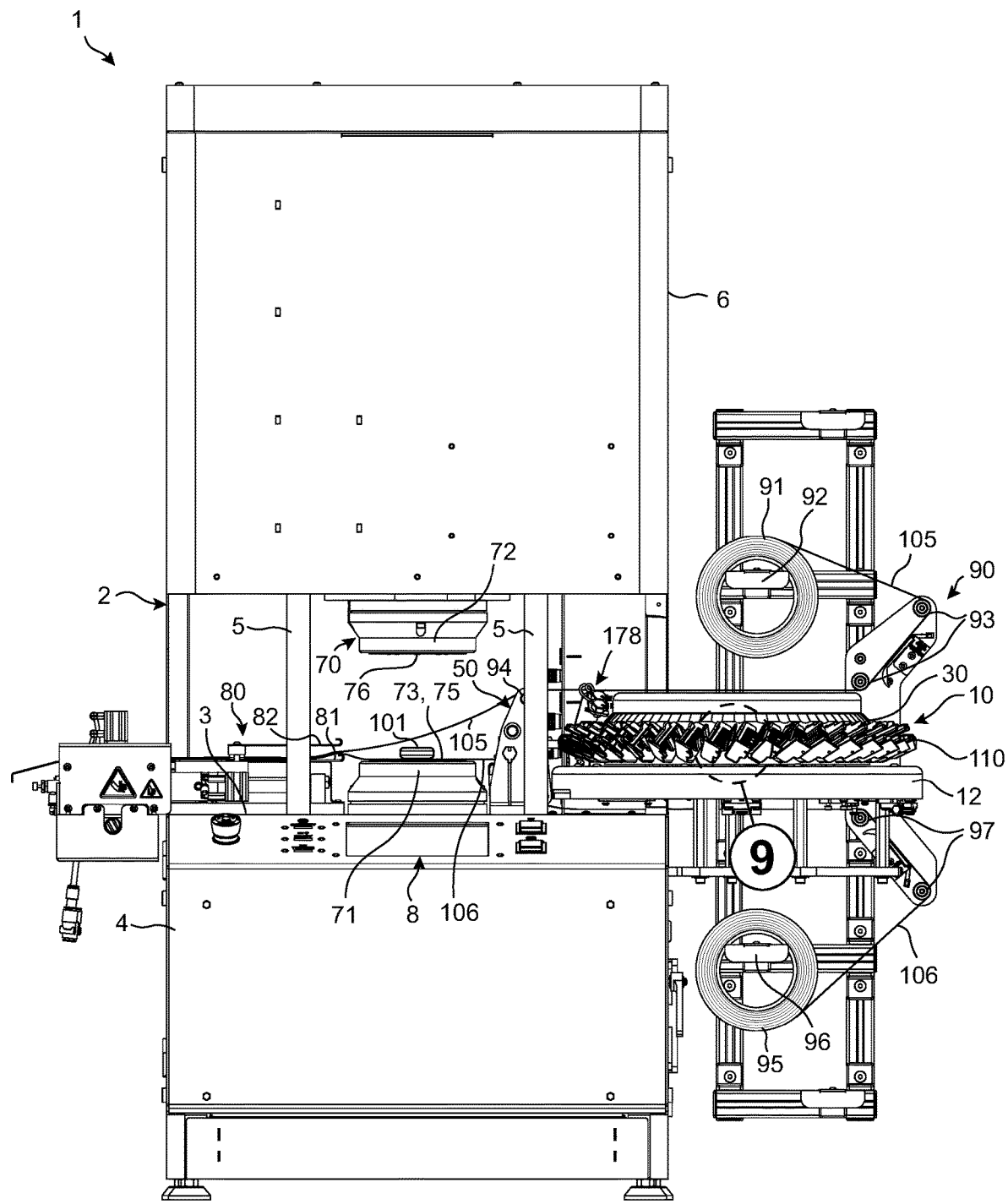
FIG. 1 is a side elevational view of a sample handling system according to an embodiment of the present invention.

The following detailed description and appended drawings describe and illustrate various exemplary embodiments of the invention. The description and drawings serve to enable one skilled in the art to make and use the invention, and are not intended to limit the present disclosure, application, or uses.

As used herein, references to terms such as "upper," "lower," "above," "below," or the like refer to relationships with respect to a vertical or height direction arranged parallel to the direction of the force of gravity. References to horizontal directions accordingly refer to directions arranged perpendicular to the vertical direction.

FIGS. 1-18 illustrate a test sample handling system 1 according to an embodiment of the present invention, referred to hereinafter as the handling system 1 for brevity. The handling system 1 generally includes a rotary sample holder 10, a lifter assembly 50, a test mechanism 70, a haul-off mechanism 80, a roller assembly 90, an upper film 105, and a lower film 106, each of which is coupled to or otherwise supported by a structural frame 2 of the handling system 1. The rotary sample holder 10 is configured to removably receive a plurality of carriers 110. Each of the carriers 110 is in turn configured to removably receive one of the samples 101 in need of testing by the handling system 1.

The structural frame 2 may include any combination of structural members and housings for positioning the relevant elements relative to each other in the manner disclosed herein. In the illustrated embodiment, a support platform 3 of the structural frame 2 forms a substantially planar and horizontally extending surface supporting the rotary sample holder 10, the lifter assembly 50, a lower portion of the test mechanism 70, the haul-off mechanism 80, and portions of the roller assembly 90. The support platform 3 is disposed on a lower housing 4 forming a portion of the structural frame 2. A plurality of vertically extending posts 5 extending upwardly from the support platform 3 to an upper housing 6 also form a portion of the structural frame 2.

The upper housing 6 may house an actuator (not shown) associated with operation of the test mechanism 70. The upper housing 6 and the lower housing 4 may include any distribution of the electrical elements or control elements required for controlling the handling system 1. For example, one or more controllers associated with operation of the handling system 1 may be included in one or both of the housings 4, 6.

The handling system 1 is described hereinafter with reference to a single controller, but it should be understood by one skilled in the art that the control system for the handling system 1 may alternatively include a plurality of different controllers or computational devices in signal communication with each other in a manner suitable for achieving the control schemes of the handling system 1 as described herein. In some embodiments, each of the associated controllers may include a suitable processing unit, memory, and one or more instruction sets necessary for carrying out the control schemes described herein. Each of the controllers is accordingly configured structurally to receive control signals from the associated sensors or user inputs of the handling system 1, to analyze, interpret, or otherwise index the received control signals, and to send any necessary control signals for operating each of the components of the handling system 1 in the manner described herein. It should also be understood that the controllers described hereinabove may also refer to relatively simple electrical elements or the like associated with performing a specific task via a specific logical operation, rather than complicated dedicated computing systems such as those described above.

The lower housing 4 is shown as including a user interface 8 for interacting with and controlling the handling system 1. However, the user interface 8 may be provided at any location on the structural frame 2 and may in some instances be provided independently of the remainder of the handling system 1, such as circumstances wherein wireless communication methods are utilized for controlling the handling system 1. The user interface 8 may be configured to interact with any associated controllers of the handling system 1 to allow the operator of the handling system 1 to preprogram the processes carried out by the handling system 1.

The roller assembly 90 generally includes a plurality of guide rollers extending in a direction perpendicular to a direction of longitudinal extension of each of the upper film 105 and the lower film 106. Each of the guide rollers may be configured to rotate about an associated axis of rotation thereof when engaged by one of the upper film 105 or the lower film 106 to facilitate motion of the corresponding film 105, 106 relative to the corresponding guide roller. Alternatively, the guide rollers may be formed as stationary cylindrical structures forming a guide surface for redirecting the films 105, 106, as desired.

In the present embodiment, the upper film 105 originates from an upper roll 91 rotatably disposed on a first spindle 92. The upper film 105 unrolls from the upper roll 91 toward a set of first upper guide rollers 93 to redirect the upper film 105 to extend in the horizontal direction towards the lifter assembly 50. A second upper roller 94 mounted to the lifter assembly 50 redirects the upper film 105 at an incline downwardly and horizontally towards the haul-off mechanism 80 while passing through the test mechanism 70.

The lower film 106 originates from a lower roll 95 rotatably disposed on a second spindle 96 at a position below the upper roll 91. The lower film 106 unrolls from the lower roll 95 around a set of first lower guide rollers 97 that redirect the lower film 106 in the horizontal direction beneath and substantially parallel to the extension of the upper film 105 when extending between the first upper guide rollers 93 and the second upper guide roller 94. The lower film 106 extends adjacent the support platform 3 while passing below a portion of the rotary sample holder 10 before reaching the lifter assembly 50. The lifter assembly 50 includes an additional pair of the guide rollers in the form of a second lower roller 98 and a third lower roller 99 (shown in FIGS. 14 and 15). The second lower roller 98 is disposed adjacent the support platform 3 and redirects the lower film 106 around an underside of the second lower roller 98 and upward towards the third lower roller 99. The lower film 106 passes over an upper surface of the third lower roller 99 to redirect the lower film 106 substantially horizontally through the test mechanism 70. At all times the lower film 106 is arranged in lateral alignment with the upper film 105 while being disposed below the upper film 105. The lower film 106 and the upper film 105 may include the same lateral width as each other. However, the lower film 106 and the upper film 105 may have differing lateral widths so long as the films 105, 106 overlap each other in the manner required for carrying out the sample testing process as disclosed herein. The films 105, 106 may be formed from a clear polymeric material having a relatively high melting temperature. The films 105, 106 may be formed from polyester, nylon, or the like, as desired.

The test mechanism 70 of the illustrated embodiment is a curemeter configured for testing the cured properties of an elastomeric material suitable for forming each of the samples 101. However, the curemeter of the present invention may be replaced with any form of test mechanism 70 suitable for testing one or more properties of one of the samples 101 without departing from the scope of the present invention. For example, various different test mechanisms 70 configured for heating, cooling, compressing, stretching, bending, straining, or otherwise testing one of the test samples 101 may be utilized without departing from the scope of the present invention, so long as the corresponding test mechanism 70 is capable of performing the associated test at the disclosed position relative to the remaining components of the disclosed handling system 1. More specifically, the current invention may be adapted for use with any test mechanism 70 having a horizontally extending test surface 75 over which each of the samples 101 is disposed before the initiation of an iteration of the testing process.

The illustrated curemeter acting as the test mechanism 70 includes a lower die 71 disposed on the support platform 3 and an upper die 72 disposed above the lower die 71. The upper die 72 and the lower die 71 are each substantially cylindrical in shape. A central portion of an upper surface 73 of the lower die 71 forms the test surface 75 of the curemeter above which each of the samples 101 is disposed when resting on the lower film 106 and prior to the initiation of the testing process. The test surface 75 of the lower die 71 forms a first pressure surface of the curemeter configured to indirectly apply pressure to a lowermost surface of each of the samples 101 via the lower film 106 during each of the test process iterations. The test surface 75 may be disposed at a height substantially similar to a height of the upper surface of the third lower roller 99. A lower surface 76 of the upper die 72 forms a second pressure surface of the curemeter configured to indirectly apply pressure to an uppermost surface of each of the samples 101 via the upper film 105 during each of the test process iterations.

The upper die 72 is slidably disposed on two or more of the vertically extending posts 5 extending between the support platform 3 and the upper housing 6 disposed above the support platform 3. As mentioned previously, the upper housing 6 encases the actuator for causing the upper die 72 to reciprocate in the vertical direction to cause the distance between the first and second pressure surfaces of the curemeter to selectively increase and decrease. The actuator may be any actuator or drive mechanism suitable for delivering the necessary axial load to each of the samples 101 in accordance with the test being performed by the associated test mechanism 70. The actuator may be electrically powered actuator or a pneumatically powered actuator, as non-limiting examples.

The haul-off mechanism 80 is configured to grasp and advance both the lower film 106 and the upper film 105 each time a new sample 101 is in need of testing when disposed over the test surface 75 the test mechanism 70. The haul-off mechanism 80 includes a lower clamp element 81 positioned below the films 105, 106 and an upper clamp element 82 positioned above the films 105, 106. One or more actuators cause the upper clamp element 82 to move in the vertical direction between an open position wherein a space is present between the lower clamp element 81 and the upper clamp element 82 and a closed position wherein the films 105, 106 are clamped between the lower clamp element 81 and the upper clamp element 82. The assembly including the lower clamp element 81 and the upper clamp element 82 is slidably disposed on a rail or similar structure of the haul-off mechanism 80 extending horizontally in the longitudinal direction of the films 105, 106 when the films 105, 106 pass through the test mechanism 70. The haul-off mechanism 80 operates by clamping the films 105, 106 between the upper clamp element 81 and the lower clamp element 82 when in the closed position before then sliding in the horizontal direction away from the test mechanism 70 to remove a recently tested one of the samples 101 from the test surface 75 of the test mechanism 70. The haul-off mechanism 80 may perform as many of the grasp and pull processes as is necessary to fully remove the previous tested sample 101 while also positioning the next of the samples 101 over the test surface 75 for performing the next iteration of the testing process.

The samples 101 are shown throughout the present disclosure as being substantially cylindrical in shape and disk-like, but it should be understood by one skilled in the art that the samples 101 may have alternative shapes and configurations without necessarily departing from the scope of the present invention. For example, the samples 101 may be formed to include any number of circumferential sides having substantially equal lengths, such as a square shape, a hexagonal shape, or an octagonal shape, as desired. The samples 101 are typically formed from an elastomeric material such as rubber, but the present invention may alternatively be adapted for the transport and testing of any of a variety of different materials while remaining within the scope of the present invention.

Figure 2:
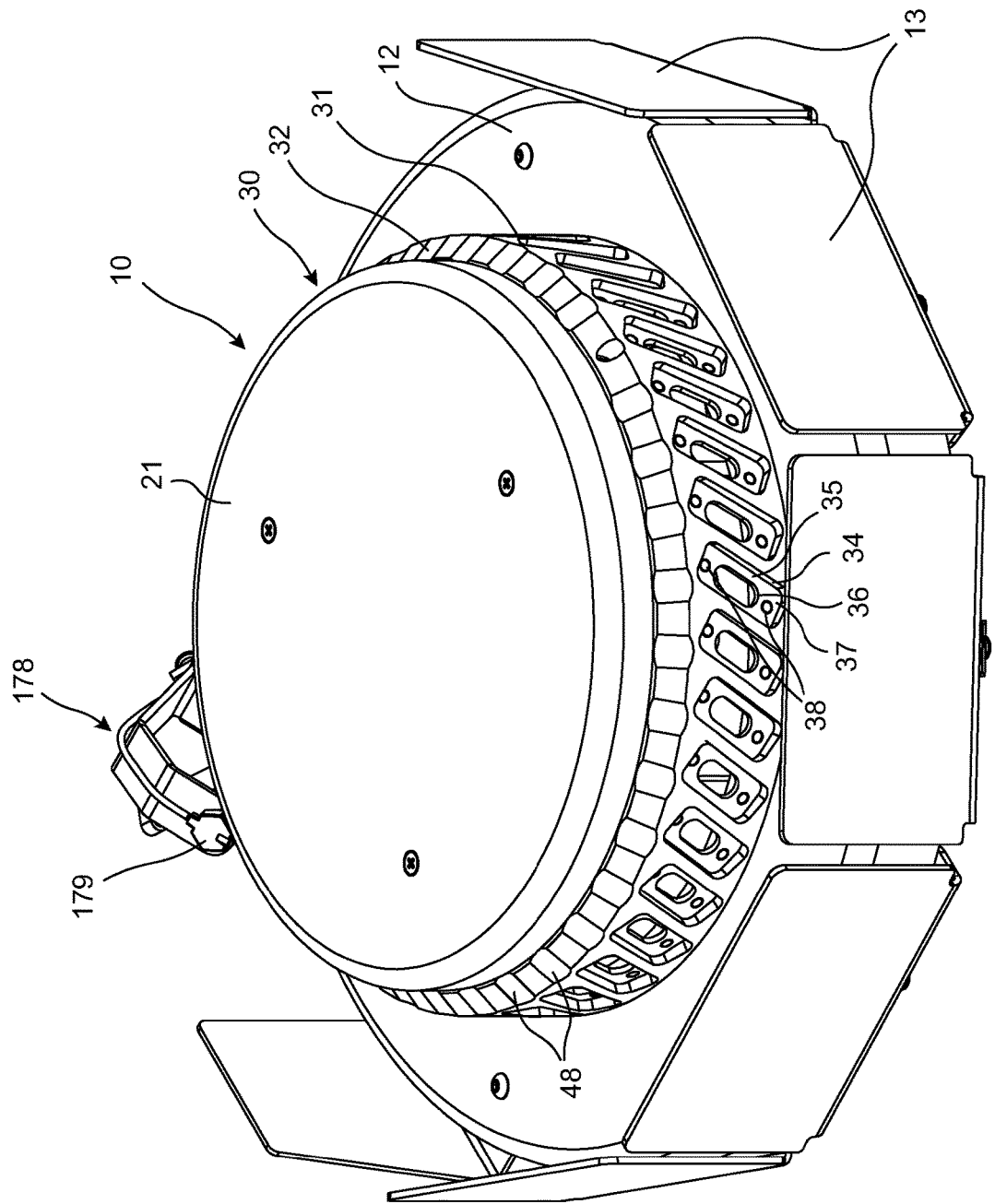
FIG. 2 is top perspective view of a rotary sample holder of the sample handling system of FIG. 1.
Figure 3:
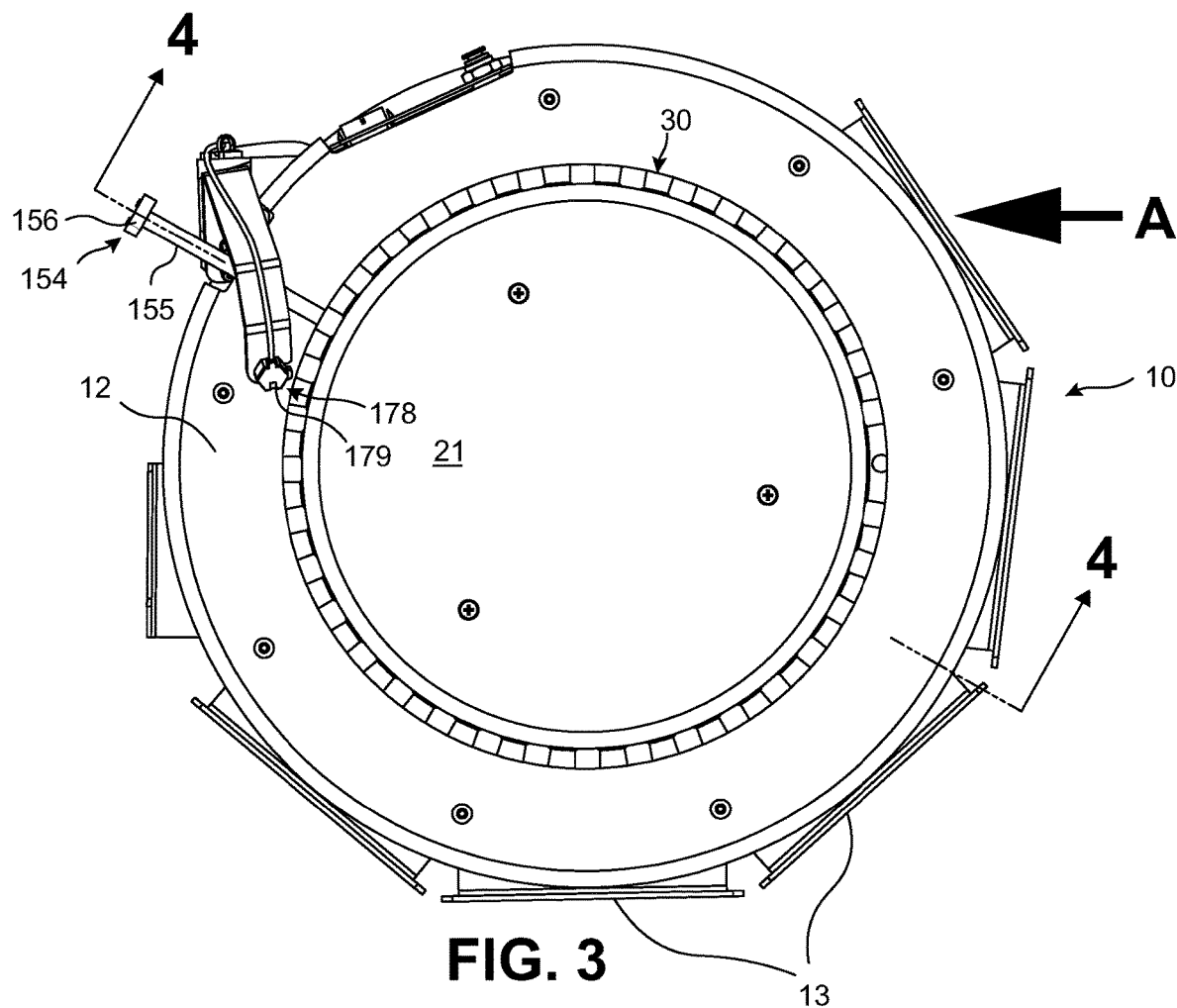
FIG. 3 is a top plan view of the rotary sample holder.
Figure 4:
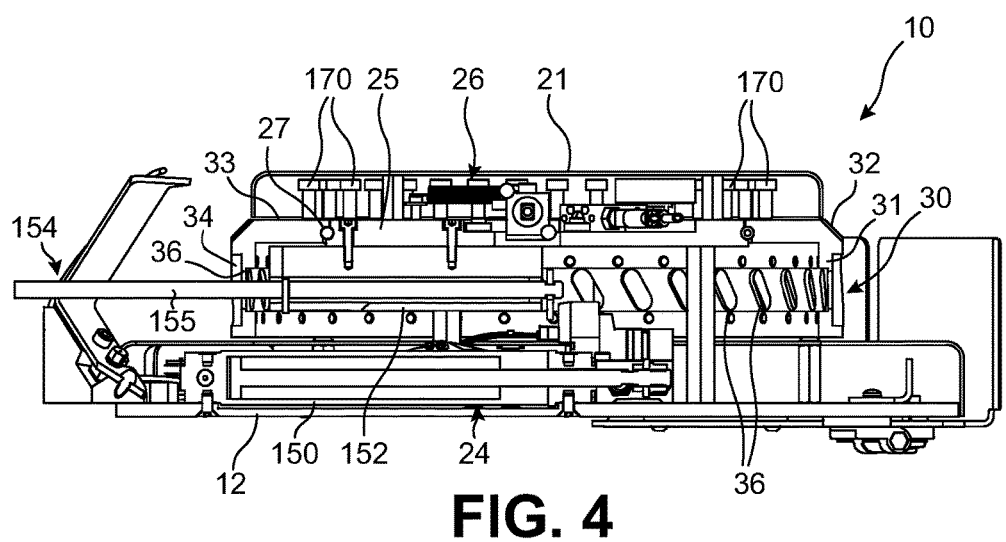
FIG. 4 is a cross-sectional view of the rotary sample holder as taken through section lines 4-4 of FIG. 3.

Referring now to FIGS. 2-8, the rotary sample holder 10 is disclosed in isolation in various different configurations. FIGS. 2-4 illustrate the rotary sample holder 10 in its entirety while FIGS. 5-8 illustrate the rotary sample holder 10 with a top cover 21 removed therefrom to expose the internal components of the rotary sample holder 10.

The rotary sample holder 10 includes a horizontally extending base structure 12 supported on the support platform 3. A space formed between the support platform 3 and the base structure 12 may receive the lower film 106 therein when extending horizontally between the first lower guide rollers 97 and the second lower roller 98. An upper platform 25 supported by the base structure 12 extends horizontally at a position spaced from and intermediate the top cover 21 and the base structure 12 with respect to the vertical direction. An arm extension assembly 24 is supported by the base structure 12 while at least a portion of a rotational positioning assembly 26 is supported by the upper platform 25. The top cover 21 extends horizontally at a position above the rotational positioning assembly 26 and is supported by the upper platform 25. The base structure 12, the upper platform 25, and the top cover 21 may be coupled to each other by any vertically extending structures to place the disclosed surfaces at the necessary relative heights while remaining within the scope of the present invention. For example, each spaced apart component may be supported by a post or similar structure configured to receive a threaded fastener for coupling the two adjacent components to each other, as desired.

The base structure 12 may include a plurality of circumferentially spaced access walls 13 formed along at least a portion of a periphery thereof. The access walls 13 are omitted from FIG. 1 so as not to obscure the view of the rotary sample holder 10, but are shown in each of FIGS. 2-4. Each of the access walls 13 is hingedly coupled to the base structure 12 in a manner wherein each of the access walls 13 can be pivoted between an open position wherein the corresponding access wall 13 is oriented substantially parallel to the base structure 12 and a closed position wherein the corresponding access wall 13 is oriented substantially perpendicular to the base structure 12. The open position allows for easy access to each of the carriers 110 coupled to the rotary sample holder 10 while the closed position prevents accidental interaction with each of the carriers 110 during a testing process. The access walls 13 may be positioned in the open position when manipulation of the carriers 110 or the corresponding samples 101 is desired, including loading or unloading either of the carriers 110 or the samples 101. The access walls 13 may alternatively be moved to the closed position when a testing process is being carried out to prevent any type of unintended interruption to the testing process by the operator of the handling system 1.

A carrier cylinder 30 of the rotary sample holder 10 extends circumferentially around the arm extension assembly 24 and the rotational positioning assembly 26. The carrier cylinder 30 includes a cylindrically shaped circumferential wall 31, a frustoconical shaped gripping feature 32 extending from an upper end of the circumferential wall 31, and an annularly and horizontally extending flanged portion 33 (FIGS. 4 and 5) extending radially inwardly from the gripping feature 32. The carrier cylinder 30 is rotationally coupled to the upper platform 25 via a ball bearing assembly 27 disposed between the flanged portion 33 of the carrier cylinder 30 and a radially outward portion of the upper platform 25. The carrier cylinder 30 accordingly rotates about a central rotational axis thereof relative to the remaining stationary components of the rotary sample holder 10, which include the base structure 12, the upper platform 25, the top cover 21, the arm extension assembly 24, and the rotational positioning assembly 26.

The gripping feature 32 of the carrier cylinder 30 includes a plurality of circumferentially spaced apart indentations 48. Each of the indentations 48 may be concavely and inwardly curved to receive a portion of a finger of the operator to aid the operator in selectively rotating the carrier cylinder 30 relative to the base structure 12.

As best shown in FIG. 2, the circumferential wall 31 of the carrier cylinder 30 includes a plurality of circumferentially spaced carrier openings 34 formed therein. Each of the carrier openings 34 includes an indented portion 35 and a through-hole 36. The indented portion 35 of each of the carrier openings 34 is formed by a portion of the circumferential wall 31 indented in the radial inward direction of the carrier cylinder 30 while the through-hole 36 of each of the carrier openings 34 is formed through the circumferential wall 31 in the radial direction at a central position within a corresponding one of the indented portions 35. The indented portion 35 of each of the carrier openings 34 is shown as including a periphery having a rounded rectangular shape, but the indented portion 35 may be provided in any closed shape, including a rectangular shape or an elliptical shape, as desired. An indented surface 37 defining an outwardly facing surface of each of the indented portions 35 includes a pair of magnetic components 38 provided on each opposing side of the corresponding through-hole 36, wherein the outer surface of each of the magnetic components 38 may be arranged substantially flush with the indented surface 37, as desired. Each of the magnetic components 38 may be formed from a permanent magnet or a magnetic component formed from a magnetic material such as a steel dowel pin, as non-limiting examples.

The through-hole 36 of each of the carrier openings 34 is shown as including substantially the same peripheral shape as the corresponding indented portion 35, but the through-hole 36 may include any peripheral shape suitable for cooperating with the arm extension assembly 24, as explained in greater detail hereinafter. The through-hole 36 of each of the carrier openings 34 is centered and spaced inwardly relative to the surrounding periphery of the corresponding indented portion 35, but any relative positioning of the through-hole 36 relative to the periphery of the indented portion 35 may be utilized so long as the magnetic components 38 are exposed on the indented surface 37 of the indented portion 35.

Figure 6:
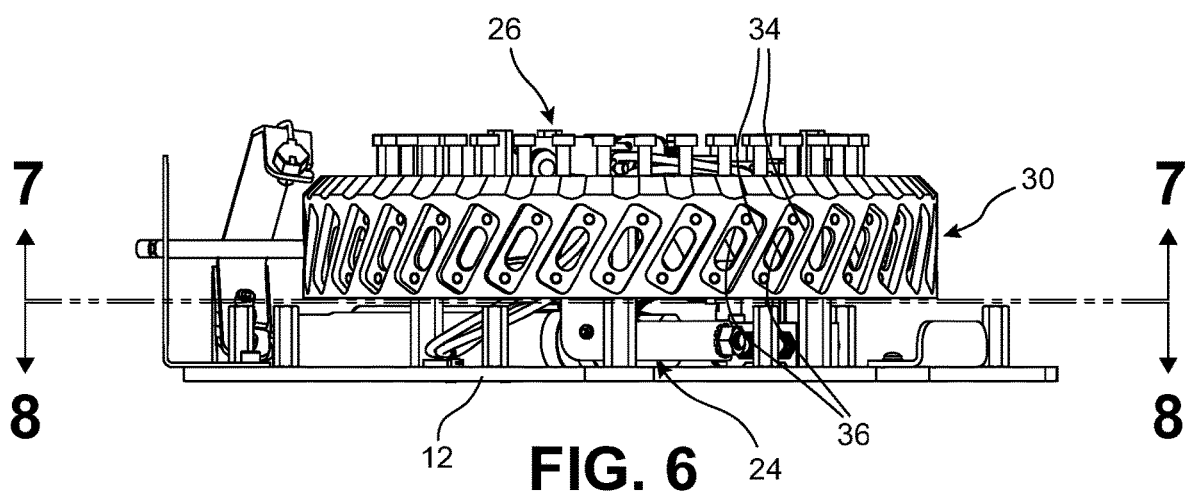
FIG. 6 is a side elevational view of the rotary sample holder with the top cover of the carrier cylinder removed.

As can be seen in FIGS. 2, 4, and 6, each of the carrier openings 34 includes a longitudinal axis arranged to be tilted relative to each of the vertical direction and the circumferential direction of the carrier cylinder 30. The tilting or angling of each of the carrier openings 34 results in the longitudinal axis of each of the carrier openings 34 also being arranged at an angle relative to the horizontal direction regardless of the rotational position of the carrier cylinder 30 relative to the base structure 12 of the rotary sample holder 10. The tilting of the longitudinal axis of each of the carrier openings 34 includes a tilting of the longitudinal axis of each of the corresponding through holes 36 and each of the surrounding indented portions 35.

Figure 9:
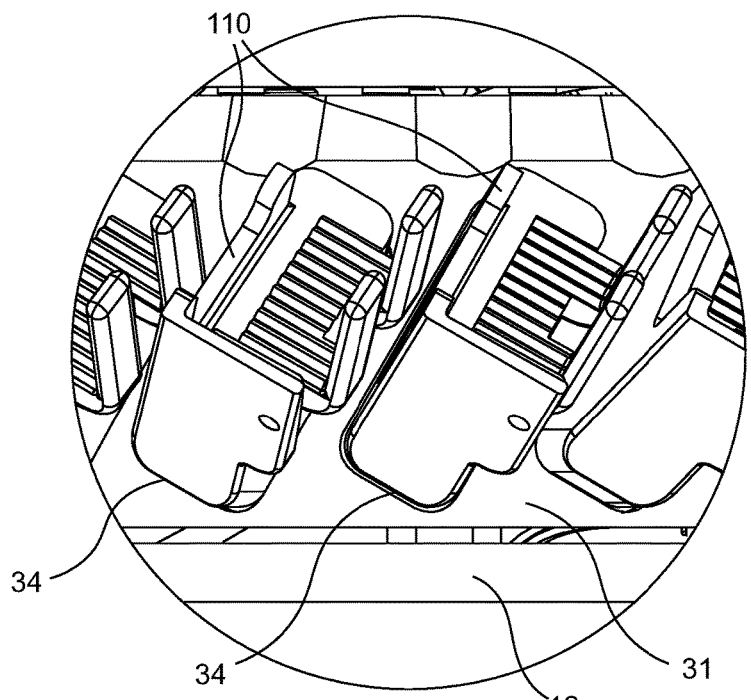
FIG. 9 is an enlarged fragmentary elevational view of the sample handling system as surrounded by circle 9 in FIG. 1, and more specifically an enlarged view of a plurality of carriers configured for removable coupling to the carrier cylinder of the rotary sample holder.
Figure 12:
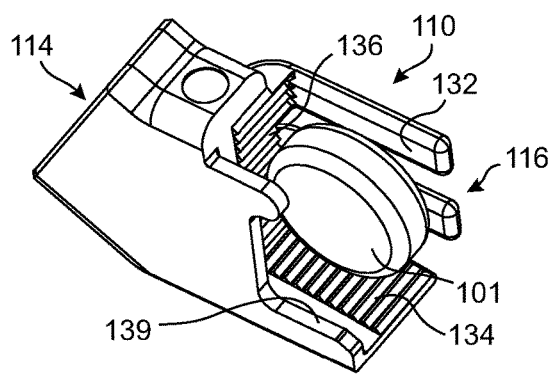
FIG. 12 is a left top perspective view of one of the carriers having a test sample disposed thereon.
Figure 13:
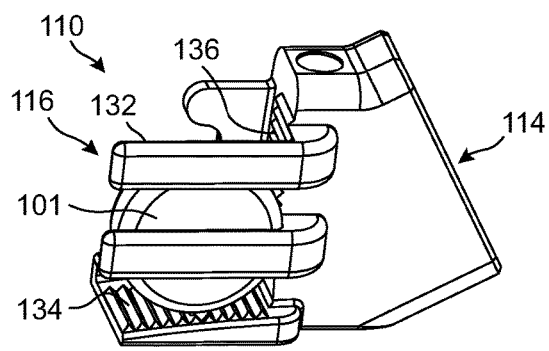
FIG. 13 is a right top perspective view of the carrier and the test sample of FIG. 12.
Figure 14:
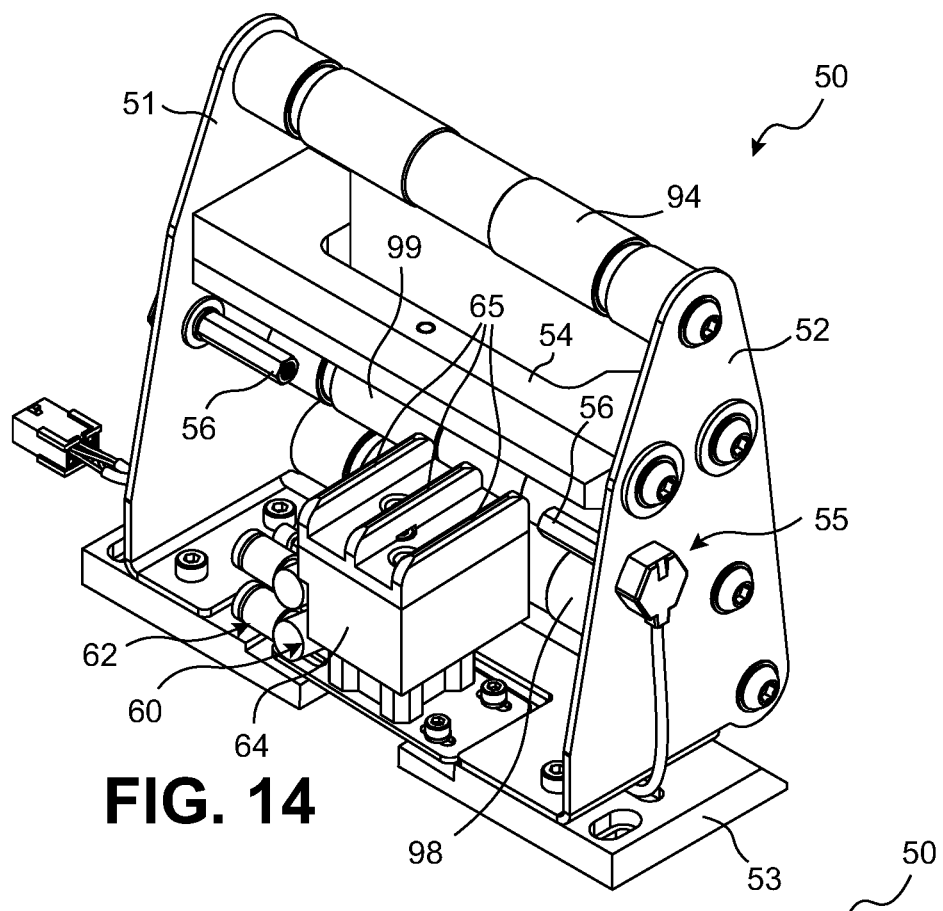
FIG. 14 is a perspective view of a lifter assembly of the sample handling system.

Each of the carrier openings 34 is configured to removably receive one of the carriers 110 therein. The rotary sample holder 10 is shown in FIG. 1 as including a plurality of the carriers 110 with one of the carriers 110 installed in each of the plurality of the carrier openings 34 disposed about the periphery of the circumferential wall 31. FIG. 9 illustrates an enlarged view of a plurality of the carriers 110 when installed into the carrier cylinder 30. Additionally, FIGS. 10-13 illustrate one of the carriers 110 in isolation to better illustrate and describe the features thereof, wherein FIGS. 10 and 11 show one of the carriers 110 in the absence of one of the samples 101 and FIGS. 12 and 13 show the one of the carriers 110 with one of the samples 101 resting thereon, as described in greater detail hereinafter.

Figure 10:
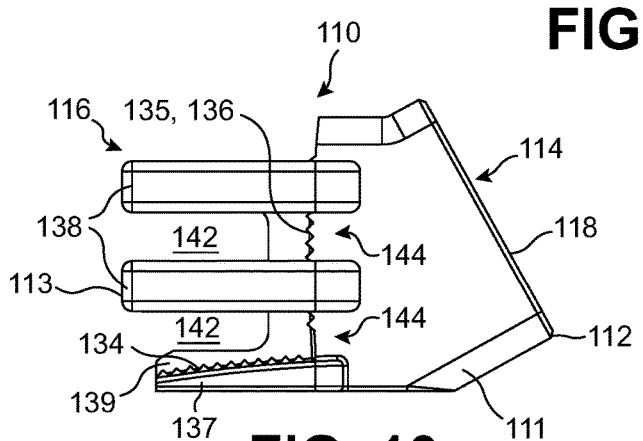
FIG. 10 is a side elevational view of one of the carriers as shown in FIG. 9.

As shown in FIG. 10, the carrier 110 is formed by a body 111 having a longitudinal axis extending from a first end 112 to a second end 113 thereof. The first end 112 of the body 111 forms a coupling feature 114 of the carrier 110 while the second end 113 of the body 111 forms a carrying feature 116 of the carrier 110.

The coupling feature 114 includes a coupling surface 118 arranged at an angle relative to the longitudinal axis of the carrier 110. The coupling surface 118 is substantially planar and includes a peripheral shape substantially corresponding in size and shape to the shape of the periphery of the indented portion 35 of each of the carrier openings 34, but slightly smaller to allow for insertion of the coupling surface 118 into the indented portion 35 and beyond the corresponding edge of the circumferential wall 31 defining the periphery of the indented portion 35. The coupling surface 118 further includes an indented portion 119 indented in a direction perpendicular to the plane of the coupling surface 118. The indented portion 119 of the coupling surface 118 includes a size and shape substantially corresponding to the size and shape of the through-hole 36 of each of the carrier openings 34. The relative size, shape, and positioning between the coupling surface 118 and the corresponding indented portion 119 is accordingly provided to substantially match the relative size, shape, and positioning between the indented portion 35 and the through-hole 36 of each of the carrier openings 34.

Figure 11:
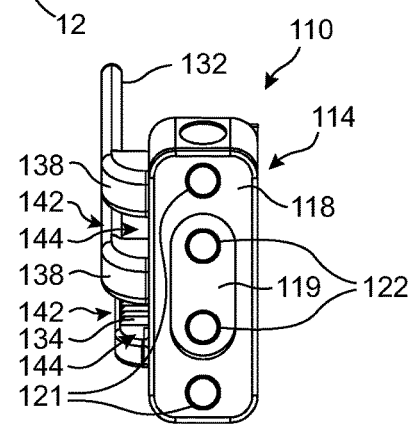
FIG. 11 is a rear elevational view of the carrier of FIG. 10.

As shown in FIG. 11, a pair of magnetic components 121 are provided in the coupling surface 118 substantially flush thereto with each of the magnetic components 121 arranged adjacent a longitudinal end of the corresponding indented portion 119. The indented portion 119 also includes a pair of magnetic components 122 provided substantially flush to an outwardly facing indented surface 123 of the indented portion 119 and arranged along a longitudinal axis of the indented portion 119. Each of the magnetic components 121, 122 may be formed from a permanent magnet or a magnetic component formed from a magnetic material such as a steel dowel pin, as non-limiting examples.

The carrying feature 116 of the carrier 110 is defined generally by a first contact surface 132, a second contact surface 134, and a third contact surface 136, wherein each of the contact surfaces 132, 134, 136 define a substantially planar surface configured to contact one of the samples 101 when received in the carrying feature 116 of the carrier 110. The first contact surface 132 and the second contact surface 134 are arranged substantially parallel to the longitudinal axis of the carrier 110 while the third contact surface 136 is arranged substantially perpendicular to the longitudinal axis of the carrier 110. The first contact surface 132 is arranged substantially perpendicular to the second contact surface 134 and the third contact surface 136, and the second contact surface 134 is arranged substantially perpendicular to the third contact surface 136 to cause the contact surfaces 132, 134, 136 to be disposed on three substantially perpendicular arranged planes.

The body 111 includes an end face 135 forming the third contact surface 136, a support wall 137 forming the second contact surface 134, and a pair of fingers 138 having inwardly facing surfaces cooperating to form the first contact surface 132. The end face 135 of the body 111 includes a substantially rectangular cross-sectional shape with the support wall 137 projecting from an end portion of the rectangular cross-section and the fingers 138 projecting from an adjacent side portion of the rectangular cross-section. The body 111 may further include an L-shaped flanged portion 139 connecting the end face 135 to the support wall 137 opposite the fingers 138 to form a retaining lip for preventing undesired removal of one of the samples 101 after reception into the carrying portion 116 of the carrier 110, such as when an operator of the handling system 1 handles one of the carriers 110 while having one of the samples 101 disposed in the carrying feature 116 thereof.

Although described as being arranged substantially parallel to the longitudinal axis of the carrier 110, the second contact surface 134 is shown in FIGS. 10-13 as including a slight outward inclination relative to the longitudinal axis of the carrier 110 as the second contact surface 134 extends away from the third contact surface 136. The outward inclination may be present to allow for samples 101 of varying outer diameters to be placed on the carrier 110 while still maintaining a desired position of a center of each of the samples 101 with respect to a direction perpendicular to the longitudinal axis of the carrier 110. The inclination of the second contact surface 134 thereby ensures that the samples 101 remain centered relative to the test surface 75 of the test mechanism 70 following a transferal of the samples 101 from the rotary sample holder 10 to the test mechanism 70 via the lifter assembly 50.

As shown in FIGS. 10, 12, and 13, the support wall 137 and the end face 135 may each be knurled to include a repeating pattern of surface projections that cooperate to form the second contact surface 134 and the third contact surface 136, respectively. The knurled surfaces may aid in preventing sticking between one of the samples 101 and the body 111 of the carrier 110, as desired.

The body 111 is shown as including two of the fingers 138, but it should be apparent to one skilled in the art that the body 111 may include additional fingers 138 without departing from the scope of the present invention. The plane defining the first contact surface 132 includes a plurality of gaps 142 formed to each longitudinal side of each of the fingers 138 with each of the gaps 142 extending longitudinally in parallel to the longitudinal direction of the body 111. The end face 135 of the body 111 further includes a plurality of notches 144 formed therein with each of the notches 144 extending inwardly from a corresponding one of the gaps 142 at a base of the fingers 138. The notches 144 extend towards the flanged portion 139 a sufficient distance such that an innermost surface defining each of the notches 144 is disposed beyond the plane defining the first contact surface 132 to allow entry of a portion of the lifter assembly 50 through the gaps 142 and beyond the first contact surface 132 when approaching from an exterior of the carrier 110, as explained in greater detail when discussing operation of the handling system 1.

The magnetic components 38 disposed on the indented surface 37 of each of the carrier openings 34 are configured to include polarities for cooperating with the magnetic components 121 disposed on the coupling surface 118 of each of the carriers 110 to magnetically couple each of the carriers 110 to the carrier cylinder 30. The magnetic components 38, 121 may be selected to provide a magnetic force capable of retaining the carriers 110 within the carrier openings 34 during operation of the handling system 1 while still allowing for manual removal of the carriers 110 from the carrier openings 34 by the operator of the handling system 1.

The inclination of the longitudinal axis of each of the carrier openings 34 formed in the carrier cylinder 30 as well as the inclination of the coupling surface 118 of each of the carriers 110 results in each of the contact surfaces 132, 134, 136 being disposed on planes arranged at an angle with respect to each of the horizontal direction and the vertical direction. As such, a sample 101 resting on the carrying feature 116 of one of the carriers 110 is caused to remain in engagement with each of the contact surfaces 132, 134, 136 as a result of the downward force of gravity. In other words, the sample 101 will tend to slide towards a lowermost arranged corner formed by the planes of the three contact surfaces 132, 134, 136 to cause at least three different positions on the outer surface of the sample 101 to come into contact with the contacts surfaces 132, 134, 136.

FIGS. 12 and 13 show one of the samples 101 when arranged relative to the corner of the carrier 110 forming the lowermost arranged corner thereof when installed into the carrier openings 34. In the provided figures, a planar surface of the sample 101 representing a bottom surface of the sample 101 contacts the first contact surface 132 formed by the fingers 138 while an outer circumferential surface of the sample 101 contacts the second contact surface 134 and the third contact surface 136 at two substantially perpendicular arranged positions on the outer circumferential surface of the sample 101. However, samples having different shapes may be configured to rest on the carriers 110 in an alternative manner without necessarily departing from the scope of the present invention, so long as the corresponding sample slides towards and rests at a desired position relative to each of the contact surfaces 132, 134, 136 via the force of gravity.

Referring back to FIGS. 3-8, the arm extension assembly 24 includes an arm extension cylinder 150, an arm sleeve 152, and a carrier arm 154. The arm extension cylinder 150 is a pneumatic cylinder actuator configured to selectively slide the carrier arm 154 within the arm sleeve 152 between an extended position wherein the carrier arm 154 is fully extended in the radial direction of the carrier cylinder 30 and a retracted position wherein the carrier arm 154 is fully retracted in the radial direction of the carrier cylinder 30. However, the arm extension cylinder 150 may be replaced with a suitable reciprocating electric actuator without departing from the scope of the present invention, as desired. The carrier arm 154 includes a cylindrical rod 155 and a head 156 disposed at a radial outermost end of the rod 155. The rod 155 is slidably disposed within a correspondingly dimensioned cylindrical opening formed through the arm sleeve 152.

Figure 7:
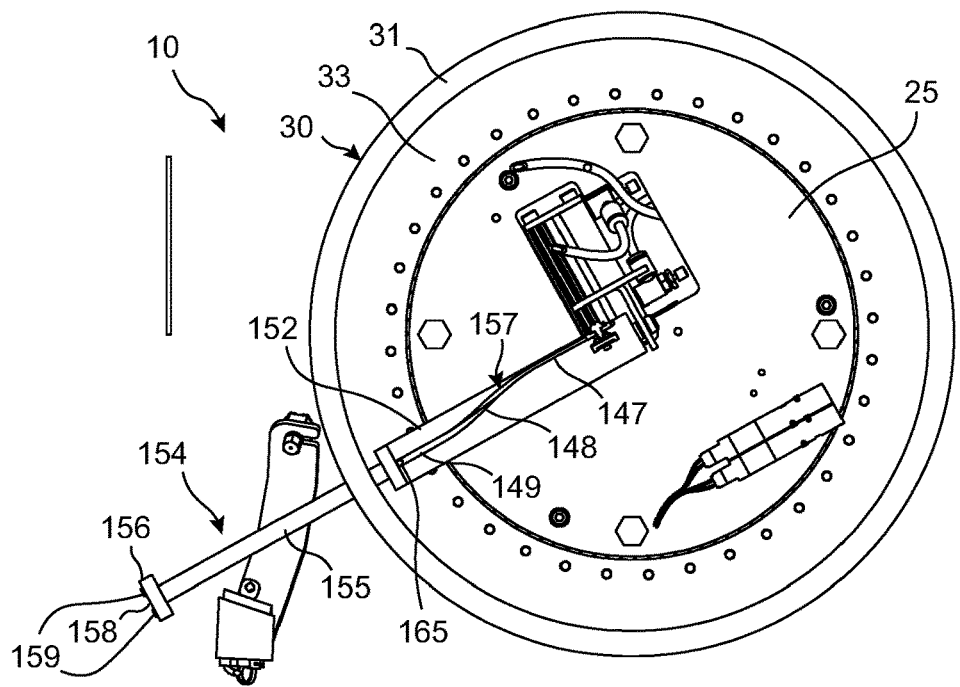
FIG. 7 is a cross-sectional view of the rotary sample holder as taken through section lines 7-7 of FIG. 6.

As shown in FIG. 7, the arm sleeve 152 includes a guide slot 157 formed through a circumferentially extending wall thereof and extending primarily in a longitudinal direction of the arm sleeve 152. The guide slot 157 includes a first linear portion 147 adjacent a radial center of the carrier cylinder 30, a transition portion 148 disposed radially outwardly of the first linear portion 147, and a second linear portion 149 disposed radially outwardly of the transition portion 148. The first linear portion 147 is formed at a first angular position on the outer surface of the arm sleeve 152 and the second linear portion 149 is formed at a second angular position of the outer surface of the arm sleeve 152, wherein the second angular position is angularly displaced from the first angular position. The transition portion 148 forms a curvilinear connection between the first linear portion 147 and the second linear portion 149 extending transverse to the longitudinal direction of the arm sleeve 152.

The rod 155 further includes a guide projection 165 extending radially outwardly therefrom, wherein the guide projection 165 is slidably received within the guide slot 157 with each of the opposing ends of the guide slot 157 forming stopping features for establishing the extended and retracted positions of the carrier arm 154. The change in angular position between the first linear portion 147 and the second linear portion 149 causes the carrier arm 154 to rotate through a corresponding rotational angle when moving the carrier arm 154 radially outwardly from the retracted position to the extended position.

The head 156 of the carrier arm 154 includes a peripheral size and shape substantially corresponding to the peripheral size and shape of each of the through-holes 36 of the carrier openings 34 and each of the indented portions 119 of the carriers 110. An outer face 158 of the head 156 may accordingly include a substantially rectangular, rounded-rectangular, or elliptical cross-sectional shape, as non-limiting examples. The outer face 158 further includes a pair of magnetic components 159 spaced from each other along a central longitudinal axis of the outer face 158 to correspond to the relative positioning between the magnetic components 122 of the indented portion 119 of each of the carriers 110. Each of the magnetic components 159 may be formed from a permanent magnet or a magnetic component formed from a magnetic material such as a steel dowel pin, as non-limiting examples. The magnetic components 159 of the outer face 158 and the magnetic components 122 of the carriers 110 have corresponding polarities to magnetically couple the head 156 of the extension arm 154 to the corresponding one of the carriers 110 when the extension arm 154 is moved radially outwardly from the retracted position towards the extended position thereof. The extension arm 154 is also configured to overcome the magnetic forces present between the magnetic components 38 of the carrier openings 34 and the magnetic components 121 of the carriers 110 when the extension arm 154 is pressurized to move radially outwardly towards the extended position in order to decouple the corresponding one of the carriers 110 from the corresponding one of the carrier openings 34. The relative positioning between the magnetic components 159 of each of the outer faces 158 is matched to the relative positioning between the magnetic components 122 of each of the carriers 110 in order to maintain an angular orientation of each of the carriers 110 when disengaging from the corresponding carrier opening 34. In other words, the corresponding polarities between the magnetic components 122, 159 ensure that each of the carriers 110 will maintain a fixed angular position relative to the head 156 as the carrier arm 154 is moved radially outwardly.

When in the retracted position, the guide projection 165 of the rod 155 is disposed within the first linear portion 147 of the guide slot 157 and the head 156 is inclined to match the inclination of each of the through-openings 36. The carrier arm 154 is positioned to extend radially outwardly at a height and radial orientation wherein the head 156 of the carrier arm 154 can pass through the through-opening 36 of a corresponding and radially aligned one of the carrier openings 34 and into the indented portion 119 of a corresponding and radially aligned one of the carriers 110. The extension of the carrier arm 154 from the retracted position to the position when engagement is made with the aligned one of the carriers 110 occurs while the guide projection 165 passes radially outwardly along the first linear portion 147 of the guide slot 157. The guide projection 165 then encounters the transition portion 148 of the guide slot 157 to cause the carrier arm 154 and the carrier 110 coupled thereto to be rotated through a rotational angle corresponding to the angular displacement between the first linear portion 147 and the second linear portion 149 of the guide slot 157 on the outer surface of the arm sleeve 152. After being rotated by the interaction between the guide slot 157 and the guide projection 165, the carrier arm 154 continues to extend radially outwardly absent additional rotation when the guide projection 165 traverses the second linear portion 149 of the guide slot 157.

As shown in FIG. 3, the carrier arm 154 extends horizontally at an angle relative to the direction of travel of the films 105, 106 when passing by the rotary sample holder 10, wherein the direction of travel is indicated by arrow A in FIG. 3. The angling of the carrier arm 154 relative to the direction of travel accommodates the non-perpendicular relationship between the coupling surface 118 and the longitudinal axis of each of the carriers 110. The angled relationship results in the fingers 138 of each of the carriers 110 being arranged to extend longitudinally in parallel to the direction of travel following the rotation of the carrier 110 during the extension thereof.

Figure 5:
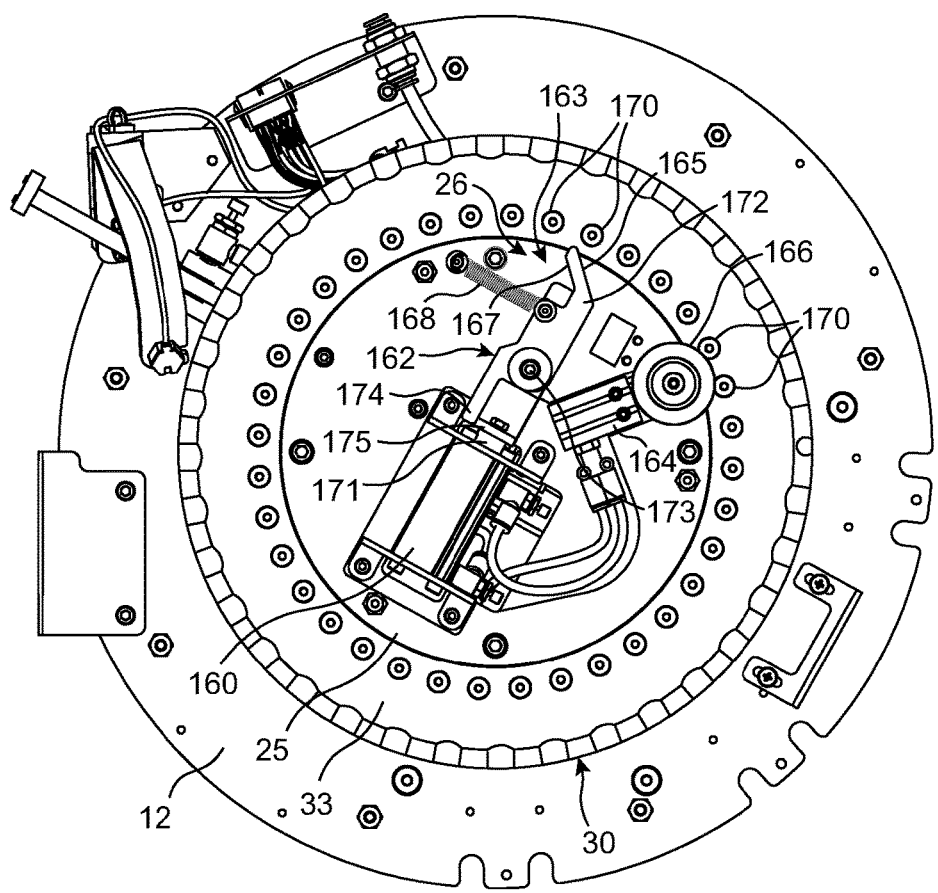
FIG. 5 is a top plan view of the rotary sample holder with a top cover of a carrier cylinder of the rotary sample holder removed.

As best shown in FIG. 5, the rotational positioning assembly 26 includes an indexing cylinder 160, an indexing rod 162, a detent cylinder 164, a detent structure 166, and a spring element 168, each of which is supported on the upper platform 25 of the rotary sample holder 10. The rotational positioning assembly 26 further includes a plurality of indexing posts 170 circumferentially spaced from each other at equal intervals on an upper surface of the flanged portion 33 of the carrier cylinder 30. Each of the indexing posts 170 corresponds to one of the carrier openings 34 formed in the circumferential wall 31. The indexing cylinder 160 and the indexing rod 162 are each disposed to extend longitudinally on a first axis passing through a central rotational axis of the carrier cylinder 30 while the detent cylinder 164 and the detent structure 166 are each disposed to extend longitudinally on a second axis passing through the central rotational axis of the carrier cylinder 30 at a position displaced angularly from the first axis.

The indexing cylinder 160 and the detent cylinder 164 are each pneumatic cylinder actuators with the indexing cylinder 160 configured to selectively slide the indexing rod 162 between a retracted position and an extended position with respect to the first axis and the detent cylinder 164 configured to selectively slide the detent structure 166 between a retracted position and an extended position with respect to the second axis. However, the indexing cylinder 160 and the detent cylinder 164 may be replaced with electric actuators configured to similarly reciprocate a corresponding component in similar fashion to the disclosed pneumatic cylinder actuators without departing from the scope of the present invention.

The indexing rod 162 includes an axial element 171 directly coupled to the indexing cylinder 160 and a pivoting element 172 pivotally connected to an end of the axial element 171 about a pivoting axis 173. The pivoting element 172 includes a ratchet feature 163 at a radially distal end thereof having both an outer inclined surface 165 and an inner inclined surface 167, each of which is arranged transverse to the longitudinal direction of the pivoting element 172. An end of the pivoting element 172 opposite the ratchet feature 163 forms a contact element 174. The spring element 168 includes a first end rotatably coupled to the upper platform 25 and a second end rotatably coupled to the pivoting element 172 adjacent the inner inclined surface 167. The first end of the spring element 168 is coupled to the upper platform 25 immediately adjacent the flanged portion 33 of the carrier cylinder 30 at a position spaced circumferentially from the position of the ratchet feature 163. The spring element 168 urges the pivoting element 172 in a direction normally causing contact between the contact element 174 and a stopping feature 175 projecting from the axial element 171. The pivoting element 172 can accordingly pivot away from the axial element 171 in only one rotational direction, which is clockwise from the perspective of FIG. 5.

The detent structure 166 is substantially cylindrical in shape and includes an outer circumferential surface configured to selectively engage two of the indexing posts 170 at a time when in the extended position. The detent structure 166 may be provided as a wheel capable of rotating about a central axis thereof. The extended position of the detent structure 166 results in a portion of the outer circumferential surface of the detent structure 166 being positioned radially outwardly of the two of the posts 170 to provide interference for preventing undesired rotation of the carrier cylinder 30 relative to the base structure 12. The retraction of the detent structure 166 in the radial inward direction disengages the interference between the posts 170 and the detent structure 166 in order to allow for desired rotation of the carrier cylinder 30.

Figure 8:
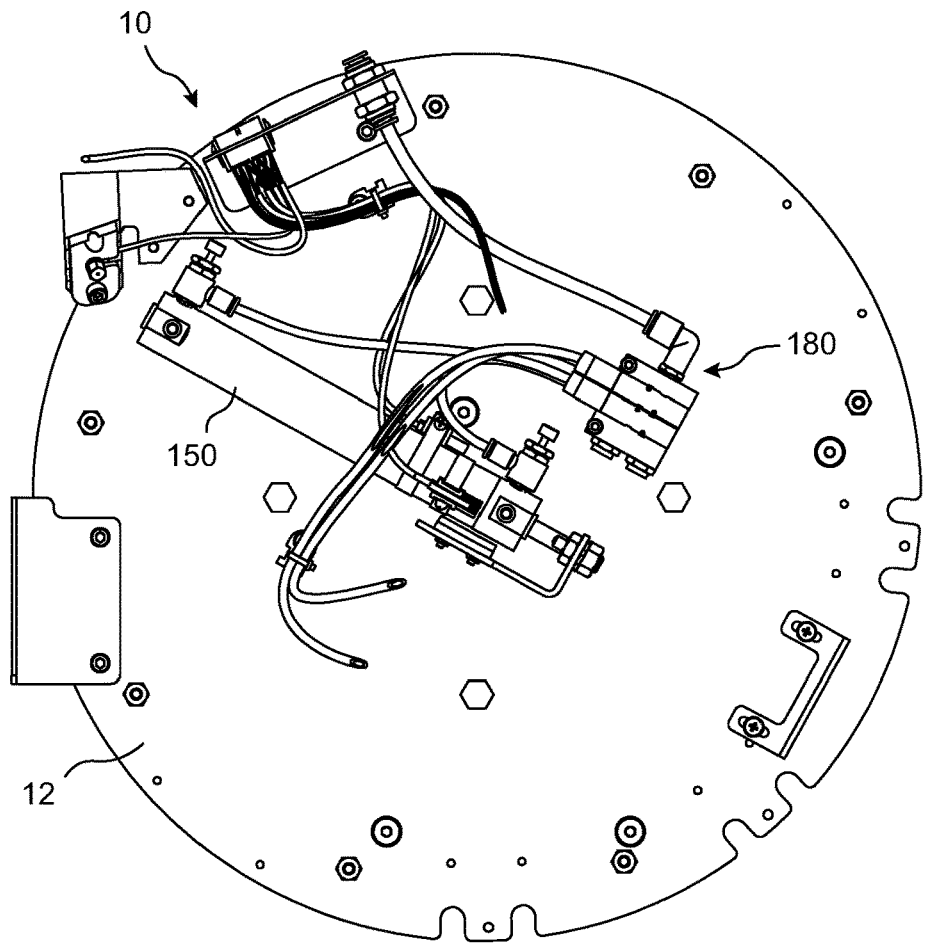
FIG. 8 is a cross-sectional view of the rotary sample holder as taken through section lines 8-8 of FIG. 6.
Figure 16:
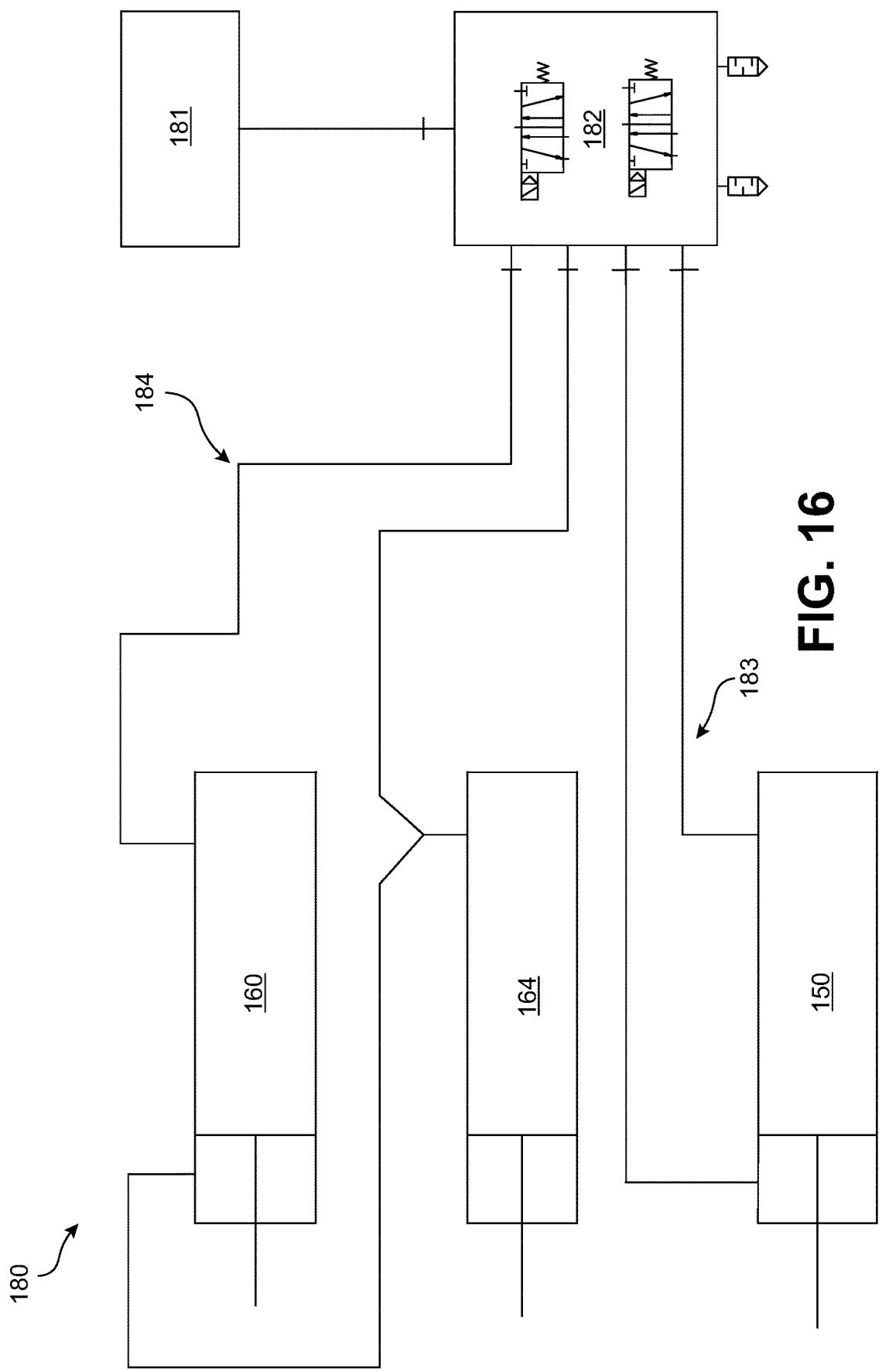
FIG. 16 is a schematic representation of a pressurized air system of the sample handling system.

The arm extension cylinder 150, the indexing cylinder 160, and the detent cylinder 164 may all be in fluid communication with a common pressurized air system 180 used to actuate each of the cylinders 150, 160, 164 between the disclosed retracted and extended positions. The various fluid connections forming the pressurized air system 180 are illustrated in FIGS. 7 and 8, but are best understood by reference to a schematic illustration of the pressurized air system 180 as shown in FIG. 16. The pressurized air system 180 includes a source of pressurized air 181, which may be mounted to the structural frame 2 or disposed within one of the housings 4, 6. The source of pressurized air 181 is in turn in fluid communication with a valve assembly 182 used to control a distribution of the pressurized air to each of the cylinders 150, 160, 164.

The arm extension cylinder 150 is provided on a first air path 183 while the indexing cylinder 160 and the detent cylinder 164 are provided in series on a second air path 184. The valve assembly 182 controls which of two ports formed at each end of each of the air paths 183, 184 is pressurized to determine which of the corresponding cylinders 150, 160, 164 is placed in the corresponding retracted or extended positions. The switching of the ports of the first air path 183 causes the carrier arm 154 associated with the arm extension cylinder 150 to selectively move between the extended position and the retracted position. The indexing cylinder 160 and the detent cylinder 164 are arranged relative to the second air path 184 wherein the pressurization of the detent cylinder 164 to place the detent structure 166 in the extended position coincides with the pressurization of the indexing cylinder 150 to place the indexing rod 162 in the retracted position when one of the two ports is pressurized. A switching to the other of the two ports results in the reversal of the positions wherein the detent structure 166 moves to the retracted position while the indexing rod 162 simultaneously moves to the extended position.

The rotational positioning assembly 26 operates as follows. The detent cylinder 164 may be normally pressurized to cause the detent structure 166 to engage two of the indexing posts 170 when it is desired to substantially fix a position of the carrier cylinder 30 relative to the base structure 12, such as during an extension of the carrier arm 154 for transporting one of the carriers 110 and an associated sample 101 away from the carrier cylinder 30 and towards the lifter assembly 50. This configuration is shown in FIG. 5. Upon a switching of the pressurization of the ports of the second air path 184, the detent structure 166 moves to the retracted position while disengaging from the two of the indexing posts 170. Concurrently, the indexing rod 162 moves from the retracted position shown in FIG. 5 towards the extended position thereof, which includes engagement between the outer inclined surface 165 of the ratchet feature 163 and one of the indexing posts 170 arranged in axial alignment with the indexing rod 162. The radial outward motion of the indexing rod 162 results in the aligned indexing rod 170 sliding along the outer inclined surface 165 of the ratchet feature 163 while pushing the carrier cylinder 30 in the clockwise direction from the perspective of FIG. 5, thereby advancing the carrier cylinder 30 one position corresponding to the distance between two adjacent ones of the carrier openings 34.

The ratchet feature 163 continues to extend radially outwardly until the inner inclined surface 167 is facing towards and in axial alignment with an adjacent one of the indexing rods 170 disposed counter-clockwise relative to the recently engaged one of the indexing rods 170. After having advanced the carrier cylinder 30, the pressurization of the second air path 184 is again reversed to cause the detent structure 166 to again engage two of the indexing posts 170 while the indexing rod 162 is moved from the extended position to the retracted position. The inner inclined surface 167 engages the recently axially aligned one of the indexing posts 170 while the carrier cylinder 30 is maintained in rotational position to cause the pivoting element 172 to pivot in the clockwise direction while the spring element 168 urges the pivoting element 172 to rotate back to the axially aligned orientation. The axial movement of the indexing rod 162 towards the retracted position accordingly includes the pivoting element 172 pivoting around the now aligned one of the indexing rods 170 until the spring element 168 returns the pivoting element 172 back into the axially aligned position with the outer inclined surface 165 now facing towards the recently aligned one of the indexing posts 170. The indexing rod 162 is then aligned and ready to advance the carrier cylinder 30 another position utilizing the same process described above.

The rotary sample holder 10 is also capable of a manual rotation mode. The second detent cylinder 164 may be provided with a relatively low pressure that is able to be overcome by an axial pressing of the detent structure 166 towards the detent cylinder 164, such as by hand manipulation. This relatively low pressure allows for the carrier cylinder 30 to be manually rotated even when the detent structure 166 engages two of the indexing posts 170. Specifically, the detent structure 166 rolls over one of the indexing posts 170 while moving axially towards the detent cylinder 164 and against the force applied by the detent cylinder 164 when an operator of the rotary sample holder 10 applies a sufficient torque to the carrier cylinder 30. The carrier cylinder 30 may be grasped via the gripping feature 32 in order to apply the torque to the carrier cylinder 30 when moving the carrier cylinder 30 to a desired rotational position for aligning a desired one of the carriers 110 having one of the samples 101 with the carrier arm 154. The manual rotation mode accordingly allows for the operator of the rotary sample holder 10 to easily test a desired one of the samples 101 at any time, thereby removing the need for excessive reordering or replacement of the samples 101 or of the carriers 110.

A first sensor assembly 178 is mounted to the base structure 12 and includes a sensor 179 directed downwardly towards a position in line with the longitudinal axis of the carrier arm 154 and along a path taken by the carriers 110 when the carrier cylinder 30 is rotated relative to the base structure 12. The first sensor assembly 178 is configured to determine whether one of the samples 101 is disposed within the one of the carriers 110 installed in a corresponding one of the carrier openings 34 instantaneously aligned with the longitudinal axis of the carrier arm 154, which may alternatively be referred to as the ready position for transporting the associated sample 101. The first sensor assembly 178 is configured to communicate the determination of the presence of the one of the samples 101 in the ready position to the controller of the handling system 1 to initiate the radially outward extension of the carrier arm 154 towards the lifter assembly 50.

The lifter assembly 50 includes a base plate 53 arranged parallel to and supported by the support platform 3, a first plate 51 extending from a first end of the base plate 53, and an oppositely arranged second plate 52 extending from a second end of the base plate 53. The first plate 51 and the second plate 52 are arranged perpendicular to the base plate 53 while disposed to each lateral side of the films 105, 106 when the films 105, 106 pass through the lifter assembly 50. The second upper roller 94, the second lower roller 98, and the third lower roller 99 are each disposed to extend laterally between the first plate 51 and the second plate 52. A guide bar 54 extends laterally between first plate 51 and the second plate 52 at a position immediately below the second upper roller 94.

Figure 15:
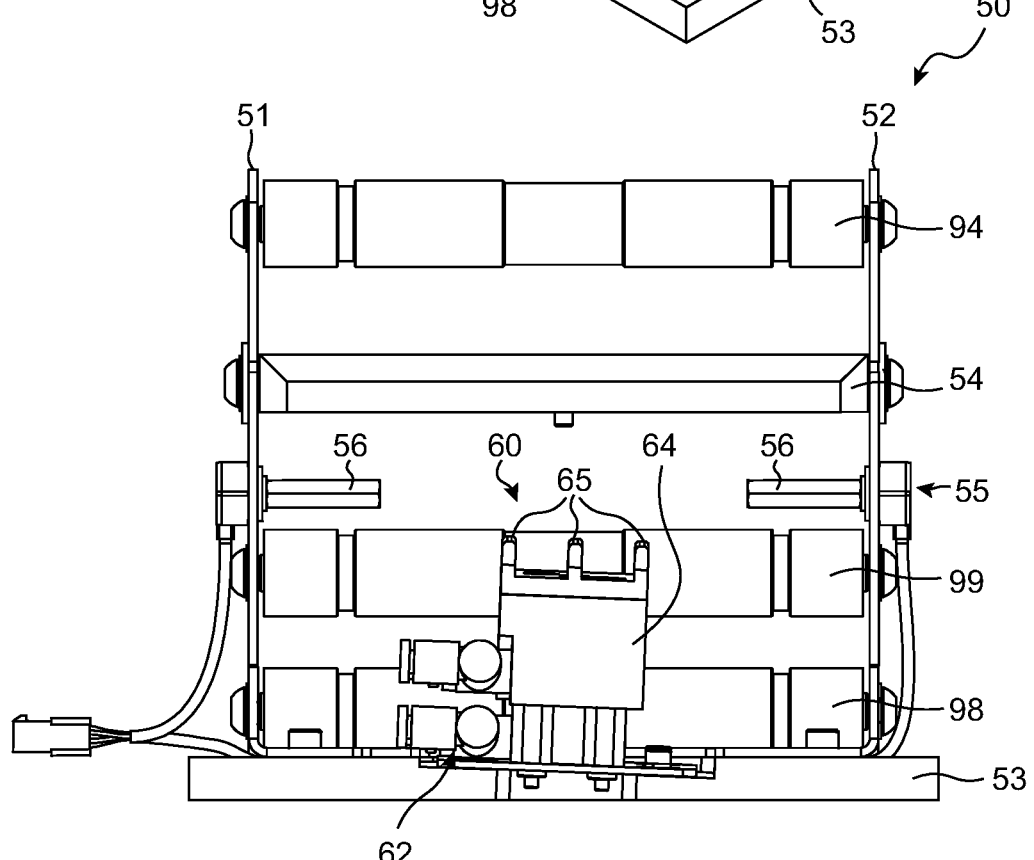
FIG. 15 is a front elevational view of the lifter assembly of FIG. 14.

The base plate 53 supports a lifter mechanism 60 disposed intermediate the first plate 51 and the second plate 52. The lifter mechanism 60 includes a lift actuator 62 configured to reciprocate a lifter body 64 of the lifter mechanism 60 vertically between a lowered or retracted position and a raised or extended position. The lift actuator 62 is illustrated as a pneumatic cylinder actuator, but the lift actuator 62 may alternatively be an electric actuator, as desired. The lifter body 64 may be substantially rectangular cuboid in shape and includes a plurality of support ridges 65 extending horizontally in a direction parallel to the direction of travel of the lower film 106 when passing from the third lower roller 99 and towards the test surface 75 of the test mechanism 70. The support ridges 65 project away from the lifter body 64 a common distance and cooperate to define a support plane of the lifter mechanism 60. The support ridges 65 are spaced from each other laterally at intervals corresponding to the lateral spacing of the gaps 142 formed between the fingers 138 of each of the carriers 110. As best shown in FIG. 15, the lifter body 64 and the support plane defined by the distal surfaces of the support ridges 65 may be tilted about each of a first axis extending in the general direction of travel of the films 105, 106 when passing through the test mechanism 70 and an second axis arranged perpendicular to the first axis. The tilting of the support plane may be provided to ensure sequential engagement of the support plane formed by the support ridges 65 with the underside of the sample 101 when moving upwards towards the sample 101 from below. An uppermost one of the support ridges 65 is disposed in alignment with an uppermost surface of the third lower roller 99 with respect to the vertical direction when the lifter body 64 is in the lowered or retracted position. As disclosed above, the uppermost surface of the third lower roller 99 also coincides with the plane of travel of the lower film 106 when passing through the test mechanism 70, hence the lower film 106 is disposed immediately above the uppermost one of the support ridges 65 when the lifter body 64 is in the lowered or retracted position.

A second sensor assembly 55 is disposed at a height immediately above the uppermost surface of the third lower roller 99 and includes a pair of inwardly directed sensors 56. One of the sensors 56 is coupled to the first plate 51 while the other of the sensors 56 is coupled to the second plate 52 to cause the sensors 56 to straddle the films 105, 106 when the films 105, 106 pass through the lifter assembly 50. The second sensor assembly 55 is configured to determine the presence of one of the samples 101 within one of the carriers 110 when the one of the carriers 110 has been extended above the lifter mechanism 60 as a result of the extension of the carrier arm 154 of the arm extension assembly 24. The lifter body 64 is moved from the lowered or retracted position to the raised or extended position only when the second sensor assembly 55 determines that one of the carriers 110 having one of the samples 101 has been positioned above the lifter mechanism 60.

In use, the operator of the handling system 1 loads as many of the samples 101 as desired into a corresponding number of the carriers 110 with each of the samples 101 resting against all three of the contact surfaces 132, 134, 136. The samples 101 may be placed within the carriers 110 prior to the coupling of the carriers 110 to the carrier cylinder 30 or after the coupling of the carriers 110 to the carrier cylinder 30, as desired. As explained hereinabove, the carriers 110 are removably coupled to the carrier cylinder 30 by magnetically coupling the coupling surface 118 of each of the carriers 110 to the indented portion 35 of each of the carrier openings 34 via the magnetic connection formed between the respective magnetic components 38, 121. When coupled to the carrier cylinder 30, each of the carriers 110 is oriented wherein each of the contact surfaces 132, 134, 136 is inclined relative to the direction of gravity to establish a position of each of the samples 101 in each of three different perpendicular directions.

The coupling of the carriers 110 to the carrier cylinder 30 may include the pivoting of one or more of the access walls 13 from the upright closed position to the outwardly extending open position to provide better access to the circumferential wall 31 of the carrier cylinder 30. The carrier cylinder 30 may be placed at a desired rotational position via a gripping of the carrier cylinder along the gripping feature 32 and hand rotation of the carrier cylinder 30 relative to the base structure 12 when the rotary sample holder 10 is placed in the manual operation mode. The carrier cylinder 30 may be rotated until placed at a position wherein a first one of the samples 101 in need of testing is placed at the ready position while aligned with the longitudinal axis of the carrier arm 154 and within the sensing range of the first sensor assembly 178.

Once the carriers 110, the corresponding samples 101, and the carrier cylinder 30 are positioned accordingly, the operator of the handling system 1 may interact with the user interface 8 in order to initiate a test iteration of the test mechanism 70. Alternatively, the operator may initiate an automatic testing mode wherein a plurality of sequential test iterations are performed with respect to a plurality of the samples 101 installed into the carriers 110. The test iterations are performed in an order corresponding to an order of the samples 101 when proceeding in a circumferential direction of the carrier cylinder 30 starting at the ready position in alignment with the longitudinal axis of the carrier arm 154.

The automatic testing mode includes the first sensor assembly 178 making a determination of whether or not one of the samples 101 is in the ready position and sending a control signal to the controller regarding the associated determination. If the controller receives a control signal indicating that the carrier opening 34 positioned in the ready position is devoid of one of the carriers 110 and samples 101, the controller sends a control signal to the valve assembly 182 of the pressurized air system 180 in order to actuate the indexing cylinder 160 and the detent cylinder 164 to advance the carrier cylinder 30 one additional rotational position. The determination of the presence of one of the samples 101 in the ready position is repeated until one of the samples 101 is detected by the first sensor assembly 178.

Figure 17:
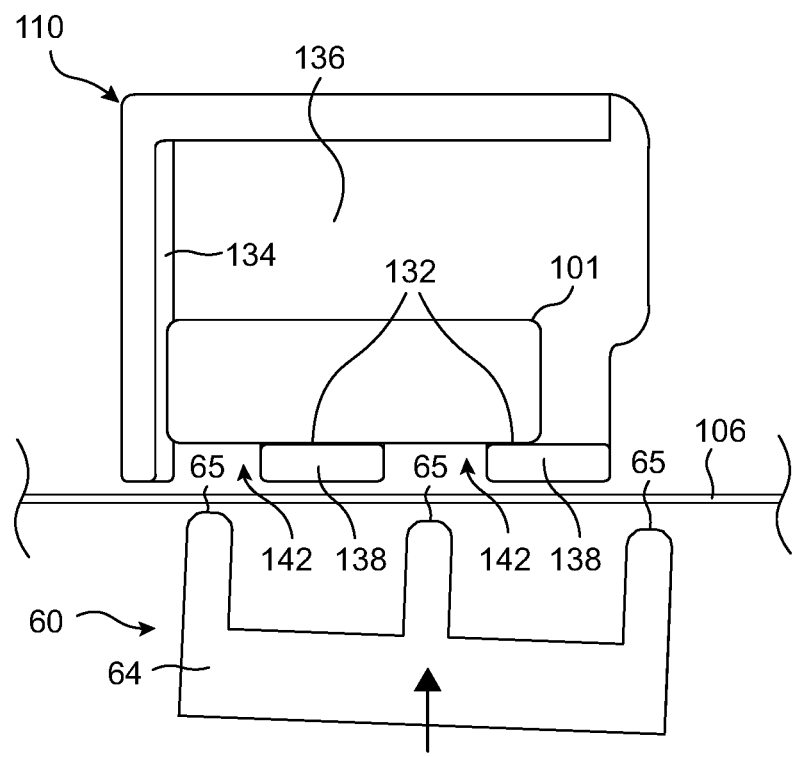
FIG. 17 is a fragmentary elevational view showing a relationship between one of the carriers and a lifter mechanism prior to transferal of one of the samples from the carrier to a film disposed between the carrier and the lifter mechanism.

Once one of the samples 101 is detected in the ready position, the controller of the handling system 1 sends a control signal to the pressurized air system 180 to cause the extension of the carrier arm 154. The carrier arm 154 extends radially outwardly to decouple the aligned carrier 110 from the carrier opening 34 via a separation of the magnetic components 38, 121. The carrier 110 is simultaneously coupled to the head 156 of the carrier arm 154 via the attraction between the magnetic components 122, 159. The extension of the carrier arm 154 includes the rotation of the carrier arm 154 as a result of the shape of the guide slot 157 while the carrier 110 having the sample 101 is rotated in unison with the carrier arm 154. The carrier 110 is rotated through an angle sufficient for placing the first contact surface 132 formed by the inwardly facing surfaces of the fingers 138 in a substantially horizontal position parallel to the support platform 3 of the structural frame 2. The carrier 110 is extended to a position wherein the fingers 138 thereof extend directly above and in parallel to the support ridges 65 while the lower film 106 is disposed between a lower surface of the fingers 138 and an upper surface of the support ridges 65. Additionally, the support ridges 65 are positioned below and in vertical alignment with the gaps 142 formed to either side of each of the fingers 138. Such a relationship between the carrier 110 and the lifter body 64 prior to transferal of the sample 101 is shown in FIG. 17.

Figure 18:
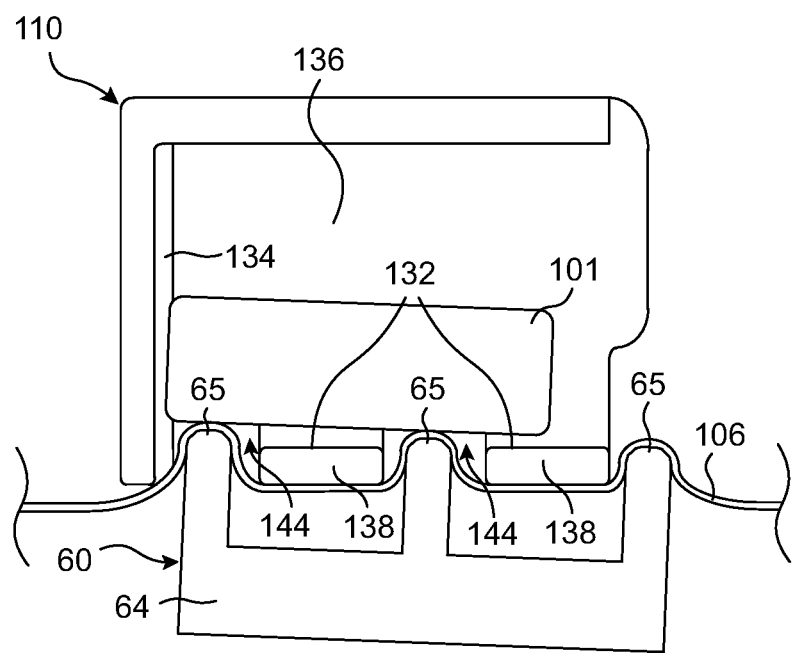
FIG. 18 is a fragmentary elevational view showing the relationship between the carrier and the lifter mechanism following the transferal of the sample from the carrier to the film while supported by the lifter mechanism.

The extension of the carrier arm 154 into the lifter assembly 50 causes the sensor assembly 55 to determine the presence of the sample 101 within the carrier 110 disposed above the lifter mechanism 60. The sensor assembly 55 sends a control signal to the controller and the controller in turn initiates an extension of the lifter body 64 from the lower or retracted position to the raised or extended position. As shown in FIG. 18, the upward motion of the lifter body 64 causes the support ridges 65 and the intervening lower film 106 to project into the gaps 142 and the notches 144 formed between the fingers 138 of the carrier 110. The lifter mechanism 60 accordingly transfers a bottom planar surface of the sample 101 contacting the first contact surface 132 to a substantially planar surface formed by the cooperation of each portion of the lower film 106 supported on the support ridges 65. The sample 101 is accordingly separated from the carrier 110 and supported by the lower film 106 at a desired position with respect to each of the direction of travel of the lower film 106 and the direction lateral to the direction of travel.

The controller then causes the haul-off mechanism 80 to grasp the upper film 105 and the lower film 106 to pull the films 105, 106 in unison. The pulling of the lower film 106 causes the sample 101 supported thereon to be pulled in unison, thereby removing the sample 101 from being disposed above and supported by the support ridges 65. The sample 101 is able to move with the lower film 106 in the direction of travel until positioned above the test surface 75 of the test mechanism 70 while still resting on the lower film 106. The controller then causes the test mechanism 70 to perform a test iteration with respect to the sample 101 placed on the test surface 75.

The automatic testing mode causes the handling system 1 to continue to detect the presence of the samples 101 within the carriers 110 and to continue to transport and test the samples 101 in sequential order. The haul-off mechanism 80 may be configured to pull the films 105, 106 for removing the recently tested one of the samples 101 at the same time the next one of the samples 101 is being removed from one of the carriers 110 via the lifter assembly 50. In this way, a plurality of the test iterations can be carried out efficiently and without substantial interruption.

The disclosed handling system 1 provides numerous advantages over the handling systems of the prior art. The rotary sample holder 10 can be manually positioned to perform a test with respect to any of the installed samples 101. The manner in which the carrier cylinder 30 freely rotates while substantially exposed to the operator offers for ease of access to the carriers 110 for easily removing, replacing, or reordering the samples 101. The rotary nature of the rotary sample holder 10 also allows for a large quantity of the samples 101 to be installed and ready for testing during a single automatic testing process. The carriers 110 advantageously establish a position of each of the samples 101 in three different transverse directions in order to later establish a desired position of each of the samples 101 relative to a test surface 75 of the associated test mechanism 70 following transport thereto. The manner in which the lower film 106 approaches the samples 101 from below via the lifter body 64 also eliminates instances of sticking or the like that may be evident via use of a pick-and-place mechanism. The manner in which the carriers 110 are removably installed into the carrier cylinder 30 also provides for flexibility to the system, as only the carriers 110 must be altered or adapted to account for samples of different shapes and configurations.

The test sample handling system 1 may also be modified from the embodiment disclosed herein while still remaining within the scope of the present invention. More specifically, the above mentioned advantageous features relating to the rotary nature of the rotary sample holder 10 as well as the manner in which the lifter assembly 50 precisely picks the samples 101 up while preventing sticking may be individually applied to alternative embodiments of the present invention without necessary departing from the scope of the present invention. For example, the rotary sample holder 10 may be replaced with an alternative mechanism configured to position one of the carriers 110 having one of the samples 101 relative to the lifter assembly 50 in the manner described while still appreciating the disclosed advantages of lifter assembly 50 of the associated handling system. Specifically, the disclosed method of seamlessly picking up the samples 101 by approaching them from beneath using the lifter assembly 50 may be replicated regardless of the structure of the sample holder used for positioning the associated carrier 110 relative to the lifter assembly 50. Alternatively, the disclosed advantages of the manually rotated carrier cylinder 30 of the rotary sample holder 10 may also be evident in embodiments that utilize a different method of removing one of the samples 101 from one of the carriers 110. The present invention is accordingly not intended to be limited to the disclosed combination of the rotary sample holder 10 and the lifter assembly 50, as the advantages of either mechanism may be independently appreciated depending on the circumstances.

One possible modification to the handling system 1 may include the rotary sample holder 10 being replaced with a non-rotary mechanism capable of aligning one of the carriers 110 with an associated carrier arm 154 suitable for moving the carrier 110 towards the lifter assembly 50 for carrying out the picking process disclosed herein. For example, the sample holder may instead include a linear translatable holder structure that translates the carriers 110 to be in alignment with the associated carrier arm 154 in subsequent fashion. The sample holder may be disposed on a conveyer belt or a linear drive screw, for example, for facilitating the translation of the carriers 110 in either or both of a horizontal and a vertical direction for placing the carriers 110 at the desired position and orientation relative to the lifter assembly 50. If the conveyer belt is used, the carriers 110 may be capable of moving in unison with the belt in a manner wherein the carriers 110 can complete full cycles around the belt pathway while traveling in a common direction in a manner resembling the rotation of the rotary sample holder 10.

As another example, the rotary sample holder 10 may be replaced with a multi-axis robotic arm or the like capable of picking up and orienting the carriers 110 relative to the lifter assembly 50, as desired. Such a robotic arm may be preprogrammed to know the position and orientation of each of the carriers 110 relative to the lifter assembly 50 for repeatedly and reliably picking and placing the carriers 110.

Another modification may include the use of a stationary sample holder while the remaining components of the handling system 1 such as the lifter assembly 50 are caused to move relative to the stationary sample holder. For example, the remainder of the handling system 1 may be translated or rotated relative to the stationary sample holder for aligning the carriers 110 with the lifter assembly 50 in the prescribed manner.

Lastly, the rotary nature of the rotary sample holder 10 may be maintained while further modifying the handling system 1 to include a reorienting of the axis about which the rotary sample holder 10 rotates, such as aligning the rotary sample holder 10 to rotate about a horizontal axis for placing the carriers 110 in the desired positions. Such a reorientation may be employed to prevent interference between the sample holder 10 and the adjacent components of the handling system 1, as desired.

While certain representative embodiments and details have been shown for purposes of illustrating the invention, it will be apparent to those skilled in the art that various changes may be made without departing from the scope of the disclosure, which is further described in the following appended claims.

What is claimed is:

1. A test sample handling system for transporting test samples to a testing mechanism, the test sample handling system comprising:
    a carrier including multiple fingers configured to support a planar surface of one of the test samples, wherein the fingers are spaced to form adjacent gaps;
    a film; and
    a lifter mechanism including multiple spaced support ridges configured to transfer the one of the test samples from the carrier to the film when the support ridges are received in the gaps, wherein the film is disposed between the planar surface of the one of the test samples and the support ridges.

2. The test sample handling system of claim 1, wherein a reception of the support ridges through the gaps causes the planar surface of the one of the test samples to be removed from the support of the fingers.

3. The test sample handling system of claim 1, wherein the receiving of the support ridges through the gaps causes the one of the test samples to be transferred from the fingers to the film.

4. The test sample handling system of claim 1, wherein the one of the test samples contacts each of a first contact surface of the carrier, a second contact surface of the carrier arranged transverse to the first contact surface, and a third contact surface of the carrier arranged transverse to the first contact surface and the second contact surface when the one of the test samples is supported by the carrier.

5. The test sample handling system of claim 4, wherein the first contact surface restricts movement of the one of the test samples in a first direction, the second contact surface restricts movement of the one of the test samples in a second direction arranged perpendicular to the first direction, and the third contact surface restricts movement of the one of the test samples in a third direction arranged perpendicular to the first direction and the second direction.

6. The test sample handling system of claim 4, wherein the first contact surface, the second contact surface, and the third contact surface are all disposed on planes tilted relative to a direction of gravity when the one of the test samples is received in the carrier.

7. The test sample handling system of claim 4, wherein the first contact surface is formed by the cooperation of a plurality of the fingers, the first contact surface configured to contact the planar surface of the one of the test samples.

8. The test sample handling system of claim 1, wherein the lifter mechanism is adjustable between a lowered position and a raised position, wherein an adjustment of the lifter mechanism from the lowered position to the raised position causes the transferring of the one of the test samples from the carrier to the film.

9. The test sample handling system of claim 1, further comprising a rotary sample holder including a carrier cylinder configured to rotate about a central rotational axis thereof.

10. The test sample handling system of claim 9, wherein the rotary sample holder further includes a carrier arm adjustable between a retracted position and an extended position, wherein an extension of the carrier arm from the retracted position to the extended position includes a decoupling of the carrier from the carrier cylinder and a coupling of the carrier to the carrier arm.

11. The test sample handling system of claim 10, wherein the extension of the carrier arm from the retracted position to the extended position includes a transporting of the carrier from the carrier cylinder to the lifter mechanism.

12. The test sample handling system of claim 10, wherein the extension of the carrier arm from the retracted position to the extended position includes a rotation of the one of the test samples from an orientation wherein the planar surface of the one of the test samples contacting the carrier is tilted relative to a direction of gravity to an orientation wherein the planar surface of the one of the test samples is arranged substantially perpendicular relative to the direction of gravity.

13. The test sample handling system of claim 10, wherein the lifter mechanism is configured to transfer the one of the samples from the carrier to the film when the carrier arm is in the extended position.

14. The test sample handling system of claim 9, wherein the carrier cylinder includes a plurality of carrier openings, the carrier configured for removable coupling to any of the carrier openings.

15. The test sample handling system of claim 14, wherein each of the carrier openings is formed in a circumferential wall of the carrier cylinder, wherein each of the carrier openings includes an indented portion of the circumferential wall and a through-hole formed through the indented portion of the circumferential wall.

16. The test sample handling system of claim 15, wherein the carrier includes a coupling surface configured for removable coupling to the indented portion of the circumferential wall, and wherein a carrier arm of the rotary sample holder is configured to extend through the through-hole for removing the carrier from the corresponding carrier opening.

17. A test sample handling system for transporting test samples to a testing mechanism, the test sample handling system comprising:
- a rotary sample holder including a carrier cylinder configured to rotate about a central rotational axis thereof and a carrier arm adjustable between a retracted position and an extended position;
- a carrier including multiple fingers configured to support a planar surface of one of the test samples, the carrier removably coupled to the carrier cylinder, wherein the fingers are spaced to form adjacent gaps;
- a film; and
- a lifter mechanism adjustable between a lowered position and a raised position, wherein the lifter mechanism includes multiple spaced support ridges configured to transfer the one of the test samples from the carrier to the film when the support ridges are received in the gaps, wherein the film is disposed between the planar surface of the one of the test samples and the support ridges.

18. The test sample handling system of claim 17, wherein an adjustment of the carrier arm from the retracted position to the extended position includes a decoupling of the carrier from the carrier cylinder and a transporting of the carrier and the one of the test samples to a position above the lifter mechanism.

19. The test sample handling system of claim 17, wherein an adjustment of the lifter mechanism from the lowered position to the raised position includes a removal of the one of the test samples from being supported by the carrier.

20. The test sample handling system of claim 17, wherein the receiving of the support ridges through the gaps causes the one of the test samples to be transferred from the fingers to the film.

* * * * *